(12) United States Patent
Horn et al.

(10) Patent No.: US 12,381,667 B2
(45) Date of Patent: Aug. 5, 2025

(54) RESOURCE OFFSET MAPPING FOR MULTIPLEXING

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL)

(*) Notice: Subject to any disclaimer, the term of this patent is extended or adjusted under 35 U.S.C. 154(b) by 605 days.

(21) Appl. No.: 17/862,871

(22) Filed: Jul. 12, 2022

(65) Prior Publication Data

US 2024/0022362 A1  Jan. 18, 2024

(51) Int. Cl.
*H04L 5/00* (2006.01)
*H04W 8/24* (2009.01)

(52) U.S. Cl.
CPC ............ *H04L 5/0005* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 2018/0167933 A1* | 6/2018 | Yin | ........................ | H04L 5/0055 |
| 2021/0367713 A1* | 11/2021 | Rudolf | ................... | H04L 1/1822 |
| 2022/0061046 A1* | 2/2022 | Baldemair | ............ | H04L 5/0053 |
| 2022/0085863 A1* | 3/2022 | Haustein | ............... | H04B 7/0617 |
| 2023/0122592 A1* | 4/2023 | Baldemair | ............ | H04L 1/0014 370/329 |
| 2023/0309107 A1* | 9/2023 | Karaki | .................. | H04L 5/0044 |
| 2024/0147256 A1* | 5/2024 | Guthmann | ......... | H04B 7/06952 |
| 2024/0235740 A1* | 7/2024 | Rudolf | .............. | H04W 72/0446 |

\* cited by examiner

*Primary Examiner* — Phirin Sam
(74) *Attorney, Agent, or Firm* — Holland & Hart LLLP/Qualcomm

(57) ABSTRACT

Methods, systems, and devices for wireless communications are described. For instance, the described techniques support resource offset mapping for multiplexing. Resource offset mapping may refer to the mapping of frequency-domain symbols to different subsets of resources that are offset from each other or separated by gaps. For instance, a first wireless device may map a first set of frequency-domain symbols to a first subset of subcarriers and a second set of frequency-domain symbols to a second subset of subcarriers. A lowest subcarrier of the second subset of subcarriers may be separated by an offset or a gap from a highest subcarrier of the first subset of subcarriers. As a result, at least some distortion experienced on subcarriers in the gap may not spread to other subcarriers, and the reliability and throughput of communications between the first wireless device and a second wireless device may improve.

30 Claims, 12 Drawing Sheets

RESOURCE OFFSET MAPPING FOR MULTIPLEXING

FIELD OF TECHNOLOGY

The following relates to wireless communications, including resource offset mapping for multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support communications at sub-THz frequencies. One target for communications at sub-THz frequencies is to increase throughput by a factor compared to millimeter wave (mmW) communications. Improved techniques for supporting communications at sub-THz frequencies may be desirable.

SUMMARY

The described techniques relate to improved methods, systems, devices, and apparatuses that support resource offset mapping for multiplexing. Resource offset mapping may refer to the mapping of frequency-domain symbols to different subsets of resources that are offset from each other or separated by gaps. For instance, a first wireless device may map a first set of frequency-domain symbols to a first subset of subcarriers and a second set of frequency-domain symbols to a second subset of subcarriers, and a second wireless device may de-map the first set of frequency-domain symbols from the first subset of subcarriers and the second set of frequency-domain symbols from the second subset of subcarriers. A lowest subcarrier of the second subset of subcarriers may be separated by an offset or a gap from a highest subcarrier of the first subset of subcarriers. As a result, at least some distortion experienced on subcarriers in the gap may not spread to other subcarriers, and the reliability and throughput of communications between the first wireless device and the second wireless device may improve.

A method for wireless communication at a first wireless device is described. The method may include performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols, mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset, performing a frequency-domain to time-domain transform on the mapped first set of frequency-domain symbols and the mapped second set of frequency-domain symbols to obtain a set of time-domain samples, and transmitting signaling obtained from the set of time-domain samples to a second wireless device.

An apparatus for wireless communication at a first wireless device is described. The apparatus may include a processor, memory coupled with the processor, and instructions stored in the memory. The instructions may be executable by the processor to cause the apparatus to perform a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols, map the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset, perform a frequency-domain to time-domain transform on the mapped first set of frequency-domain symbols and the mapped second set of frequency-domain symbols to obtain a set of time-domain samples, and transmit signaling obtained from the set of time-domain samples to a second wireless device.

Another apparatus for wireless communication at a first wireless device is described. The apparatus may include means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols, means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset, means for performing a frequency-domain to time-domain transform on the mapped first set of frequency-domain symbols and the mapped second set of frequency-domain symbols to obtain a set of time-domain samples, and means for transmitting signaling obtained from the set of time-domain samples to a second wireless device.

A non-transitory computer-readable medium storing code for wireless communication at a first wireless device is described. The code may include instructions executable by a processor to perform a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols, map the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset, perform a frequency-domain to time-domain transform on the mapped first set of frequency-domain symbols and the mapped second set of frequency-domain symbols to obtain a set of time-domain samples, and transmit signaling obtained from the set of time-domain samples to a second wireless device.

Some examples of the method, apparatuses, and non-transitory computer-readable medium described herein may further include operations, features, means, or instructions for transmitting a capability indication indicating that the first wireless device may be capable of mapping frequency-domain symbols to different subsets of subcarriers separated by one or more offsets, where mapping the first set of frequency-domain symbols to the first subset of subcarriers and the second set of frequency-domain symbols to the second subset of subcarriers may be based on transmitting the capability indication.

Some examples of the method, apparatuses, and non-transitory computer-readable medium described herein may further include operations, features, means, or instructions for receiving a capability indication indicating that the second wireless device may be capable of de-mapping frequency-domain symbols from different subsets of subcarriers separated by one or more offsets, where mapping the first set of frequency-domain symbols to the first subset of subcarriers and the second set of frequency-domain symbols to the second subset of subcarriers may be based on receiving the capability indication.

Some examples of the method, apparatuses, and non-transitory computer-readable medium described herein may further include operations, features, means, or instructions for transmitting a capability indication indicating a quantity of different subsets of subcarriers to which the first wireless device may be capable of mapping frequency-domain symbols, where mapping the first set of frequency-domain symbols to the first subset of subcarriers and the second set of frequency-domain symbols to the second subset of subcarriers may be based on the capability indication indicating that the first wireless device may be capable of mapping frequency-domain symbols to at least two different subsets of subcarriers.

Some examples of the method, apparatuses, and non-transitory computer-readable medium described herein may further include operations, features, means, or instructions for receiving a capability indication indicating a quantity of different subsets of subcarriers from which the second wireless device may be capable of de-mapping frequency-domain symbols, where mapping the first set of frequency-domain symbols to the first subset of subcarriers and the second set of frequency-domain symbols to the second subset of subcarriers may be based on the capability indication indicating that the second wireless device may be capable of de-mapping frequency-domain symbols from at least two different subsets of subcarriers.

Some examples of the method, apparatuses, and non-transitory computer-readable medium described herein may further include operations, features, means, or instructions for communicating an indication of one or more locations at which the first wireless device may be to divide a set of subcarriers into different subsets of subcarriers for mapping frequency-domain symbols, where the set of multiple subcarriers may be divided at one of the one or more locations into the first subset of subcarriers to which the first set of frequency-domain symbols may be mapped and the second subset of subcarriers to which the second set of frequency-domain symbols may be mapped.

Some examples of the method, apparatuses, and non-transitory computer-readable medium described herein may further include operations, features, means, or instructions for communicating an indication of the offset between the lowest subcarrier of the second subset of subcarriers and the highest subcarrier of the first subset of subcarriers, where mapping the first set of frequency-domain symbols to the first subset of subcarriers and the second set of frequency-domain symbols to the second subset of subcarriers may be based on communicating the indication of the offset.

Some examples of the method, apparatuses, and non-transitory computer-readable medium described herein may further include operations, features, means, or instructions for communicating an indication of mapping the first set of frequency-domain symbols to the first subset of subcarriers and the second set of frequency-domain symbols to the second subset of subcarriers, where mapping the first set of frequency-domain symbols to the first subset of subcarriers and the second set of frequency-domain symbols to the second subset of subcarriers may be based on communicating the indication.

Some examples of the method, apparatuses, and non-transitory computer-readable medium described herein may further include operations, features, means, or instructions for communicating a request to map the first set of frequency-domain symbols to the first subset of subcarriers and the second set of frequency-domain symbols to the second subset of subcarriers, where communicating the indication may be based on communicating the request.

Some examples of the method, apparatuses, and non-transitory computer-readable medium described herein may further include operations, features, means, or instructions for determining, based on reference signals received from the second wireless device, an impact of leakage on a signal-to-noise ratio for subcarriers between the first subset of subcarriers and the second subset of subcarriers, where communicating the request may be based on the impact of the leakage satisfying a threshold.

Some examples of the method, apparatuses, and non-transitory computer-readable medium described herein may further include operations, features, means, or instructions for communicating an indication to map other frequency-domain symbols to a contiguous set of subcarriers for a subsequent data stream and mapping the other frequency-domain symbols to the contiguous set of subcarriers for the subsequent data stream based on communicating the indication.

Some examples of the method, apparatuses, and non-transitory computer-readable medium described herein may further include operations, features, means, or instructions for communicating a request to map the other frequency-domain symbols to the contiguous set of subcarriers for the subsequent data stream, where communicating the indication may be based on communicating the request.

Some examples of the method, apparatuses, and non-transitory computer-readable medium described herein may further include operations, features, means, or instructions for determining, based on reference signals received from the second wireless device, an impact of leakage on a signal-to-noise ratio on a subset of the contiguous set of subcarriers, where communicating the request may be based on the impact of the leakage failing to satisfy a threshold.

A method for wireless communication at a first wireless device is described. The method may include performing a time-domain to frequency-domain transform on signaling received from a second wireless device to obtain frequency-domain symbols, de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset, performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols, and demodulating the first set of time-domain symbols and the second set of time-domain symbols to obtain a data stream.

An apparatus for wireless communication at a first wireless device is described. The apparatus may include a processor, memory coupled with the processor, and instructions stored in the memory. The instructions may be executable by the processor to cause the apparatus to perform a time-domain to frequency-domain transform on signaling received from a second wireless device to obtain frequency-domain symbols, de-map a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset, perform a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols, and demodulate the first set of time-domain symbols and the second set of time-domain symbols to obtain a data stream.

Another apparatus for wireless communication at a first wireless device is described. The apparatus may include means for performing a time-domain to frequency-domain transform on signaling received from a second wireless device to obtain frequency-domain symbols, means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset, means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols, and means for demodulating the first set of time-domain symbols and the second set of time-domain symbols to obtain a data stream.

A non-transitory computer-readable medium storing code for wireless communication at a first wireless device is described. The code may include instructions executable by a processor to perform a time-domain to frequency-domain transform on signaling received from a second wireless device to obtain frequency-domain symbols, de-map a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset, perform a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols, and demodulate the first set of time-domain symbols and the second set of time-domain symbols to obtain a data stream.

Some examples of the method, apparatuses, and non-transitory computer-readable medium described herein may further include operations, features, means, or instructions for transmitting a capability indication indicating that the first wireless device may be capable of de-mapping frequency-domain symbols from different subsets of subcarriers separated by one or more offsets, where de-mapping the first set of frequency-domain symbols from the first subset of subcarriers and the second set of frequency-domain symbols from the second subset of subcarriers may be based on transmitting the capability indication.

Some examples of the method, apparatuses, and non-transitory computer-readable medium described herein may further include operations, features, means, or instructions for receiving a capability indication indicating that the second wireless device may be capable of mapping frequency-domain symbols to different subsets of subcarriers separated by one or more offsets, where de-mapping the first set of frequency-domain symbols from the first subset of subcarriers and the second set of frequency-domain symbols from the second subset of subcarriers may be based on receiving the capability indication.

Some examples of the method, apparatuses, and non-transitory computer-readable medium described herein may further include operations, features, means, or instructions for transmitting a capability indication indicating a quantity of different subsets of subcarriers from which the first wireless device may be capable of de-mapping frequency-domain symbols, where de-mapping the first set of frequency-domain symbols from the first subset of subcarriers and the second set of frequency-domain symbols from the second subset of subcarriers may be based on the capability indication indicating that the first wireless device may be capable of de-mapping frequency-domain symbols from at least two different subsets of subcarriers.

Some examples of the method, apparatuses, and non-transitory computer-readable medium described herein may further include operations, features, means, or instructions for receiving a capability indication indicating a quantity of different subsets of subcarriers to which the second wireless device may be capable of mapping frequency-domain symbols, where de-mapping the first set of frequency-domain symbols from the first subset of subcarriers and the second set of frequency-domain symbols from the second subset of subcarriers may be based on the capability indication indicating that the second wireless device may be capable of mapping frequency-domain symbols to at least two different subsets of subcarriers.

Some examples of the method, apparatuses, and non-transitory computer-readable medium described herein may further include operations, features, means, or instructions for communicating an indication of one or more locations at which the first wireless device may be to divide a set of subcarriers into different subsets of subcarriers for demapping frequency-domain symbols, where the set of multiple subcarriers may be divided at one of the one or more locations into the first subset of subcarriers from which the first set of frequency-domain symbols may be de-mapped and the second subset of subcarriers from which the second set of frequency-domain symbols may be de-mapped.

Some examples of the method, apparatuses, and non-transitory computer-readable medium described herein may further include operations, features, means, or instructions for communicating an indication of the offset between the lowest subcarrier of the second subset of subcarriers and the highest subcarrier of the first subset of subcarriers, where de mapping the first set of frequency-domain symbols from the first subset of subcarriers and the second set of frequency-domain symbols from the second subset of subcarriers may be based on communicating the indication of the offset.

Some examples of the method, apparatuses, and non-transitory computer-readable medium described herein may further include operations, features, means, or instructions for communicating an indication to de-map the first set of frequency-domain symbols from the first subset of subcarriers and the second set of frequency-domain symbols from the second subset of subcarriers, where de-mapping the first set of frequency-domain symbols from the first subset of subcarriers and the second set of frequency-domain symbols from the second subset of subcarriers may be based on communicating the indication.

Some examples of the method, apparatuses, and non-transitory computer-readable medium described herein may further include operations, features, means, or instructions for communicating a request for the second wireless device to map the first set of frequency-domain symbols to the first subset of subcarriers and the second set of frequency-domain symbols to the second subset of subcarriers, where communicating the indication may be based on communicating the request.

Some examples of the method, apparatuses, and non-transitory computer-readable medium described herein may further include operations, features, means, or instructions for determining, based on reference signals received from the second wireless device, an impact of leakage on a signal-to-noise ratio on subcarriers between the first subset of subcarriers and the second subset of subcarriers, where communicating the request may be based on the impact of the leakage satisfying a threshold.

Some examples of the method, apparatuses, and non-transitory computer-readable medium described herein may further include operations, features, means, or instructions for communicating an indication to de-map other frequency-domain symbols from a contiguous set of subcarriers for a subsequent data stream and de-mapping the other frequency-domain symbols from the contiguous set of subcarriers for the subsequent data stream based on communicating the indication.

Some examples of the method, apparatuses, and non-transitory computer-readable medium described herein may further include operations, features, means, or instructions for communicating a request for the second wireless device to map the other frequency-domain symbols to the contiguous set of subcarriers for the subsequent data stream, where receiving the indication may be based on communicating the request.

Some examples of the method, apparatuses, and non-transitory computer-readable medium described herein may further include operations, features, means, or instructions for determining, based on reference signals received from the second wireless device, an impact of leakage on a signal-to-noise ratio on a subset of the contiguous set of subcarriers, where communicating the request may be based on the impact of the leakage failing to satisfy a threshold.

DETAILED DESCRIPTION

Figure 1:
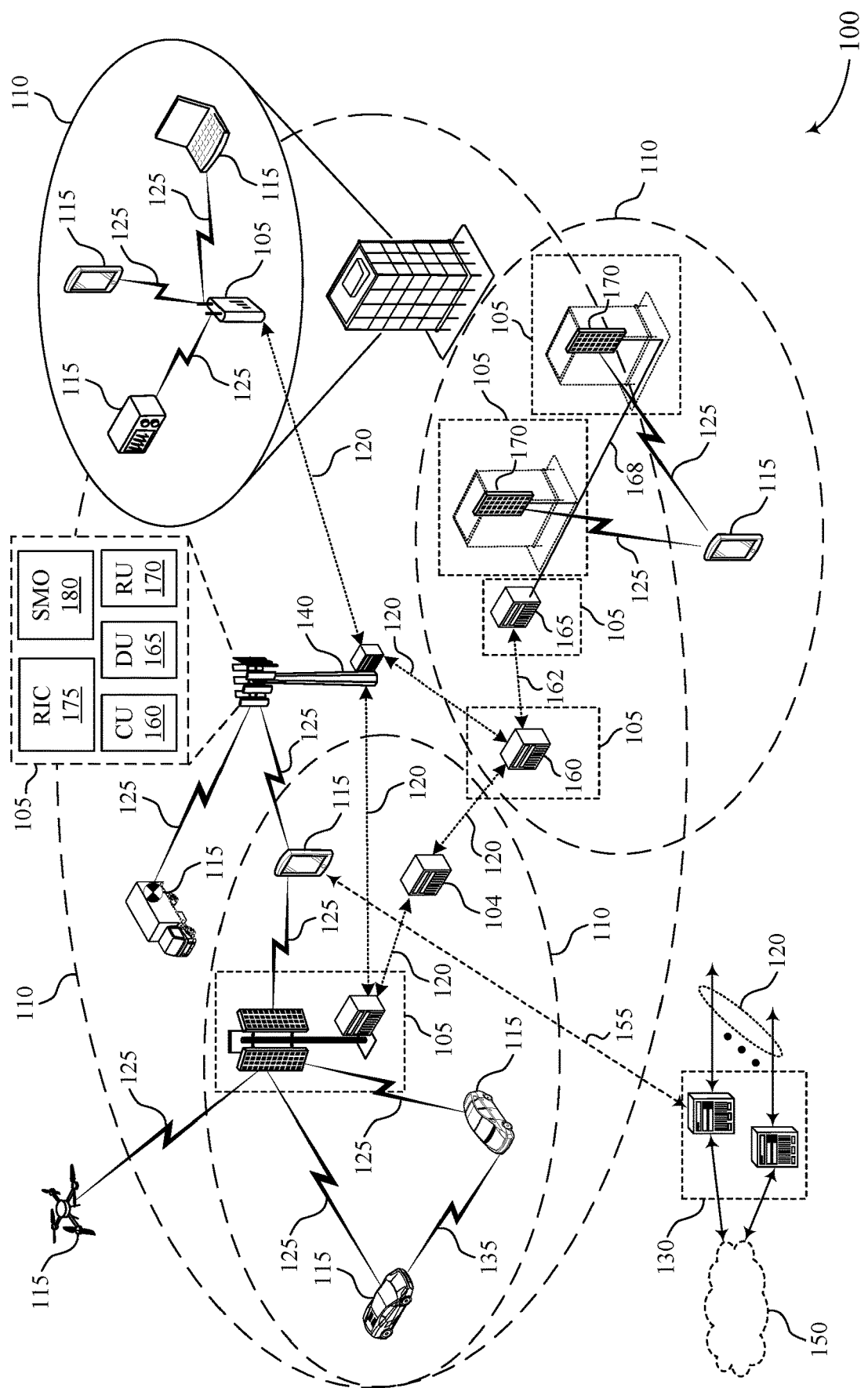
FIG. 1 illustrates an example of a wireless communications system that supports resource offset mapping for multiplexing in accordance with one or more aspects of the present disclosure.

Some wireless communications systems may support communications at sub-THz frequencies. One target for communications at sub-THz frequencies is to increase throughput by a factor compared to millimeter wave (mmW) communications. The increased throughput may be achieved by increasing a supported bandwidth (e.g., since throughput may be linearly dependent on the bandwidth). Increasing the supported bandwidth may have hardware limitations or challenges since an analog-to-digital converter (ADC) and a digital-to-analog converter (DAC) may operate with very high sampling rates (e.g., approximately 20 giga samples per second (Gs/s)). In some examples, a quadrature mixer architecture may be implemented to minimize sampling rates. The quadrature mixer architecture may convert a baseband signal to an intermediate frequency (IF) with two DAC or ADC components with half the sampling rate (e.g., approximately 10 Gs/s).

The drawbacks of a quadrature mixer may include in-phase and quadrature (IQ) imbalance and strong local oscillator (LO) leakage which may fall in the center of a bandwidth. Canceling the IQ imbalance jointly with the LO leakage may be challenging and imperfect. As a result, partial LO leakage may remain. LO leakage may negatively impact or damage many elements or components of signal processing. In one example, a power amplifier (PA) input power may be saturated with LO leakage energy. In another example, the LO leakage may be seen as a strong spur which may cause clipping or larger signal backoff which may negatively impact (e.g., reduce) a user equipment (UE) ADC dynamic effective number of bits (ENOB). In yet another example, LO leakage may cause strong noise on adjacent LO subcarriers resulting in a high noise floor.

As described herein, a wireless communications system may support efficient techniques for minimizing the effects of LO leakage from a quadrature mixer. A first wireless device (e.g., a transmitting device) and a second wireless device (e.g., a receiving device) may each adjust a multiplexing procedure (e.g., a discrete Fourier transform (DFT) spread orthogonal frequency division multiplexing (DFT-s-OFDM) procedure) to avoid spreading the impact of LO leakage from a subset of a set of resources to the full set of resources. For instance, instead of mapping frequency-domain symbols to a full set of subcarriers, the first wireless device may map a first set of frequency-domain symbols to a first subset of subcarriers and map a second set of frequency-domain symbols to a second subset of subcarriers. The second wireless device may then de-map the first set of frequency-domain symbols from the first subset of subcarriers and de-map the second set of frequency-domain symbols from the second subset of subcarriers.

A lowest subcarrier of the second subset of subcarriers may be separated from a highest subcarrier of the first subset of subcarriers by an offset. Thus, there may be a gap between the first subset of subcarriers and the second subset of subcarriers, and the gap may include subcarriers experiencing high distortion due to LO leakage. Because the first wireless device may avoid mapping frequency-domain symbols to subcarriers in the gap, and the second wireless device may avoid de-mapping frequency-domain symbols from subcarriers in the gap, the first wireless device and the second wireless device may avoid spreading distortion from subcarriers in the gap to a full set of subcarriers. As a result, the reliability and throughput of communications between the first wireless device and the second wireless device may improve.

Aspects of the disclosure are initially described in the context of wireless communications systems. Aspects of the disclosure are further illustrated by and described with reference to apparatus diagrams, system diagrams, and flowcharts that relate to resource offset mapping for multiplexing.

FIG. 1 illustrates an example of a wireless communications system 100 that supports resource offset mapping for multiplexing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource offset mapping for multiplexing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink shared channel (PDSCH) or a physical downlink control channel (PDCCH)), uplink transmissions (e.g., return link transmissions) from a UE 115 to a network entity 105 (e.g., in a physical uplink shared channel (PUSCH) or a physical uplink control channel (PUCCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels.

The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support communications at sub-THz frequencies. One target for communications at sub-THz frequencies is to increase throughput by a factor compared to mmW communications. The increased throughput may be achieved by increasing a supported bandwidth (e.g., since throughput may be linearly dependent on the bandwidth). Increasing the supported bandwidth may have hardware limitations or challenges since an ADC and a DAC may operate with very high sampling rates (e.g., approximately 20 Gs/s). In some examples, a quadrature mixer architecture may be implemented to minimize sampling rates. The quadrature mixer architecture may convert a baseband signal to an IF with two DAC or ADC components with half the sampling rate (e.g., approximately 10 Gs/s).

The drawbacks of a quadrature mixer may include IQ imbalance and strong LO leakage which may fall in the center of a bandwidth. Canceling the IQ imbalance (e.g., with frequency domain residual side band (FDRSB) compensation) jointly with the LO leakage may be challenging and imperfect. As a result, partial LO leakage may remain. LO leakage may negatively impact or damage many elements or components of signal processing. In one example, a PA input power may be saturated with LO leakage energy. In another example, the LO leakage may be seen as a strong spur which may cause clipping or larger signal backoff which may negatively impact (e.g., reduce) a UE ADC dynamic ENOB. In yet another example, LO leakage may cause strong noise on adjacent LO subcarriers resulting in a high noise floor.

In addition, in a sub-THz RF architecture, there may be additional LO sources (e.g., associated with usage of IF to RF) which may cause multiple spurs in a system resulting in a high noise floor if not handled correctly. When using higher bands, time-domain waveforms may be proposed such as in DFT-S-OFDM which may have sufficient phase noise mitigation with low complexity and good peak-to-average power (PAPR) gains compared to OFDM (e.g., 5G OFDM). In DFT-S-OFDM (e.g., different from OFDM), LO leakage or spurs may not cause high distortion on one resource element (RE) (or multiple adjacent resource elements). However, due to an inverse DFT (IDFT) operation, the distortion may be spread across all symbols and may become an error floor on all of the symbols. This error floor may be mitigated if the error floor is identifiable, but the error floor may not always be identifiable, and improved techniques for mitigating the error floor may be desirable.

The wireless communications system 100 may support efficient techniques for mitigating or eliminating the effects of LO leakage, spurs, or other errors during wireless communications (e.g., with the tradeoff of a small increase in a PAPR). A resource element offset in DFT-S-OFDM may be supported for removing LO leakage and spurs noises, and the resource element offset may be based on transmitter LO leakage or spurs or receiver LO leakage or spurs. DFT-S-OFDM using a resource element offset for mitigating LO leakage or spurs may be supported for both downlink and uplink transmissions. The described techniques may be referred to as resource offset mapping for multiplexing (e.g., DFT-S-OFDM). For instance, resource offset mapping may refer to the mapping of frequency-domain symbols to different subsets of resources that are offset from each other or separated by gaps. Because frequency-domain symbols may not be mapped to resources in these gaps, distortion experienced on resources in these gaps may not spread to other resources, and the reliability and throughput of communications in the wireless communications system 100 may improve (e.g., there may be less distortion from LO leakage or spurs).

Figure 2:
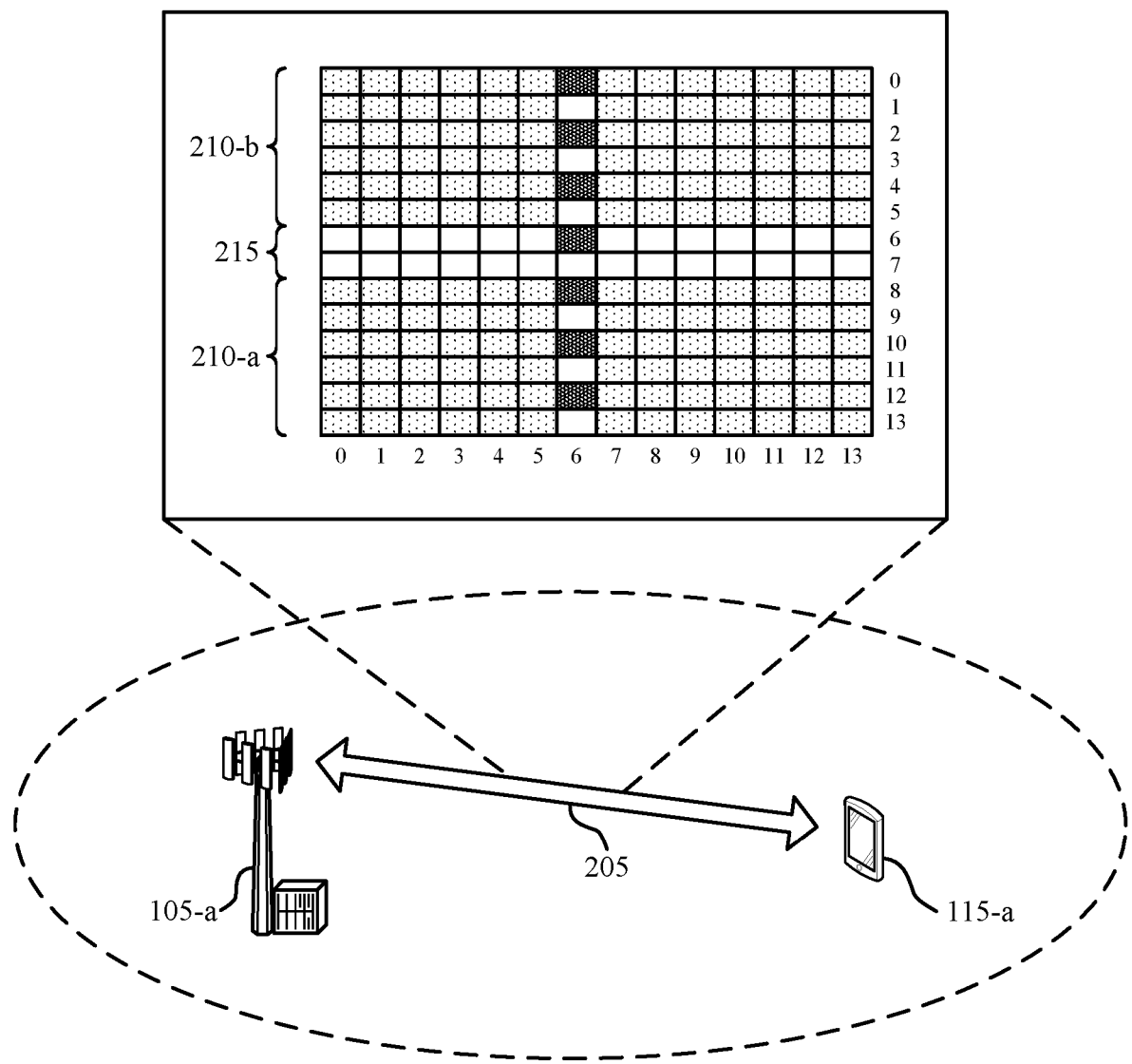
FIG. 2 illustrates an example of a wireless communications system that supports resource offset mapping for multiplexing in accordance with one or more aspects of the present disclosure.

FIG. 2 illustrates an example of a wireless communications system 200 that supports resource offset mapping for multiplexing in accordance with one or more aspects of the present disclosure. The wireless communications system 200 includes a network entity 105-a, which may be an example of a network entity 105 described with reference to FIG. 1. The wireless communications system 200 also includes a UE 115-a, which may be an example of a UE 115 described with reference to FIG. 1. The network entity 105-a may communicate with the UE 115-a on resources of a carrier 205. The configuration signaling, reporting, or other control signaling described herein from the network entity 105-a or the UE 115-a may be carried in RRC messages, MAC-CEs, downlink control information (DCI) messages (e.g., for a per-slot indication), or uplink control information (UCI) messages. The wireless communications system 200 may implement aspects of the wireless communications system 100. For instance, the wireless communications system 200 may support efficient techniques for mitigating or eliminating the effects of LO leakage, spurs, or other errors during wireless communications.

The network entity 105-a and the UE 115-a may support resource offset mapping for multiplexing. Resource offset mapping may refer to the mapping of frequency-domain symbols to different subsets of resources that are offset from each other or separated by gaps. For a downlink transmission, the network entity 105-a may map frequency-domain symbols to a first subset of subcarriers 210-a and a second subset of subcarriers 210-b, and the UE 115-a may de-map frequency-domain symbols from the first subset of subcarriers 210-a and the second subset of subcarriers 210-b. For an uplink transmission, the UE 115-a may map frequency-domain symbols to the first subset of subcarriers 210-a and the second subset of subcarriers 210-b, and the network entity 105-a may de-map frequency-domain symbols from the second subset of subcarriers 210-b. In any case, the network entity 105-a or the UE 115-a may avoid mapping frequency-domain symbols to or de-mapping frequency-domain symbols from the subcarriers 215.

The network entity 105-a or the UE 115-a may identify the subcarriers 215 to which to avoid mapping frequency-domain symbols or from which to avoid de-mapping frequency-domain symbols based on an offset. That is, the offset may indicate the subcarriers 215 between the first subset of subcarriers 210-a and the second subset of subcarriers 210-b. A lowest subcarrier of the second subset of subcarriers 210-b (e.g., subcarrier number 5) may be separated from a highest subcarrier of the first subset of subcarriers 210-a (e.g., subcarrier number 8) by the offset. In some cases, a quantity of subcarriers in the subcarriers 215 may be less than a quantity of subcarriers in a resource allocation granularity (e.g., less than a resource block). In some examples, the network entity 105-a may identify the offset and transmit an indication of the offset to the UE 115-a (e.g., for downlink transmissions or uplink transmissions), or the UE 115-a may identify the offset and transmit an indication of the offset to the network entity 105-a (e.g., for downlink transmissions or uplink transmissions). An indication of an offset may include a starting subcarrier (e.g., subcarrier number 6 in FIG. 2) of the offset and a quantity of subcarriers in the offset (e.g., 2 in FIG. 2). The network entity 105-a and the UE 115-a may identify a location of the offset (e.g., a starting subcarrier of an offset and a quantity of subcarriers in the offset) based on the subcarriers experiencing distortion. In some cases, the resources for the first subset of subcarriers 210-a and the second subset of subcarriers 210-b may be allocated as a single resource allocation. Alternatively, the first subset of subcarriers 210-a and the second subset of subcarriers 210-b may be allocated separately. In some cases, each allocation of resources (e.g., the first subset of subcarriers 210-a and the second subset of subcarriers 210-b) may be associated with an offset. Thus, the subcarriers 215 may be indicated by a difference between a first offset associated with the first subset of subcarriers 210-a and a second offset associated with the second subset of subcarriers 210-b.

In some examples, the UE 115-a may transmit a capability indication to the network entity 105-a indicating one or more capabilities associated with resource offset mapping for multiplexing. For instance, at connection establishment, the UE 115-a may signal to the network entity 105-a about the capability at the UE 115-a to support a resource element offset in DFT-S-OFDM. In some cases, the capability indication may include a report of a quantity of offsets supported by the UE 115-a (e.g., in a single allocation of resources). The quantity of offsets may correspond to a quantity of subsets of subcarriers to which the UE 115-a may map frequency-domain symbols or from which the UE 115-a may de-map frequency domain symbols (e.g., the quantity of offsets may be one less than the quantity of subsets of subcarriers). In some cases, the capability indication may include a report of desired or suggested offset locations according to an operating band. For instance, the capability indication may suggest an offset location at subcarrier number 6 along with other offset locations.

The techniques described above allow for mapping frequency-domain symbols to or de-mapping frequency-domain symbols from subcarriers using an offset. In some cases, however, it may be appropriate to map frequency-domain symbols to or de-map frequency-domain symbols from subcarriers without an offset (e.g., to contiguous subcarriers or a full set of subcarriers, including the first subset of subcarriers 210-a, the second subset of subcarriers 210-b, and the subcarriers 215). In wireless communications system 200, whether the network entity 105-a or the UE 115-a is to map frequency-domain symbols to or de-map frequency-domain symbols from subcarriers using an offset or without an offset may be configurable or may change dynamically. In some examples, the UE 115-a may transmit an indication to the network entity 105-a (e.g., or vice versa) of whether the UE 115-a and the network entity 105-a are to map or de-map frequency-domain symbols using an offset or without an offset. The indication of whether to map or de-map frequency-domain symbols using an offset or without an offset may be periodic, semi-persistent, or aperiodic.

In one example, the network entity 105-a or the UE 115-a may map or de-map frequency-domain symbols using an offset or without an offset based on channel conditions at the UE 115-a. For instance, if channel conditions at the UE 115-a are poor or fail to satisfy a threshold, the network entity 105-a or the UE 115-a may map or de-map frequency-domain symbols without an offset (e.g., to maximize a PAPR). Alternatively, if channel conditions at the UE 115-a are favorable or satisfy a threshold, the network entity 105-a or the UE 115-a may map or de-map frequency-domain symbols to subcarriers using an offset. In the case that the UE 115-a is experiencing poor channel conditions (e.g., is in a low coverage area, such as an edge of a cell), PAPR may be prioritized over minimizing the effects of LO leakage or spurs, and the network entity 105 may signal the UE 115-a to stop using an offset for resource mapping or de-mapping and to transmit or receive DFT-S-OFDM waveforms without the offset.

In another example, the network entity 105-a or the UE 115-a may map or de-map frequency-domain symbols using an offset or without an offset based on whether the network entity 105-a, the UE 115-a, or both are capable of mitigating or minimizing the effects of LO leakage or spurs. For instance, the UE 115-a may signal to the network entity 105-a indicating whether the UE 115-a is able to mitigate the effects of LO leakage or spurs such that resource mapping using an offset is avoidable (e.g., unnecessary). The UE 115-a may receive reference signals (e.g., dedicated pilots, such as demodulation reference signals (DMRSs)) from the network entity 105-a, and the UE 115-a may use the reference signals (e.g., when fully allocated) for calculating a mean squared error (MSE) on each subcarrier. If there is a strong or high MSE on a specific subcarrier (e.g., resource element), the UE 115-*a* may calculate a power ratio versus a signal power on the subcarrier, and the UE 115-*a* may estimate a DFT-S-OFDM SNR caused by LO leakage or spurs using the power ratio versus signal power.

If the SNR is high or above a threshold, the UE 115-*a* may signal to the network entity 105-*a* indicating that the UE 115-*a* is unable to mitigate the effects of LO leakage or spurs without performing resource mapping using an offset. Otherwise, the UE 115-*a* may signal to the network entity 105-*a* indicating that the UE 115-*a* is able to mitigate the effects of LO leakage or spurs without performing resource mapping using an offset. The report from the UE 115-*a* of whether the UE 115-*a* is able to mitigate the effects of LO leakage or spurs may depend on an MCS used for a transmission. For a high MCS, some techniques for mitigating the effects of LO leakage or spurs may be insufficient (e.g., perfect cancelation may only be achieved through successive interference calculation (SIC) which may be complex). Thus, resource mapping using an offset may be appropriate to mitigate the effects of LO leakage or spurs. In some examples, the report from the UE 115-*a* of whether the UE 115-*a* is able to mitigate the effects of LO leakage or spurs may depend on a resource allocation (e.g., may be allocation dependent).

Figure 3:
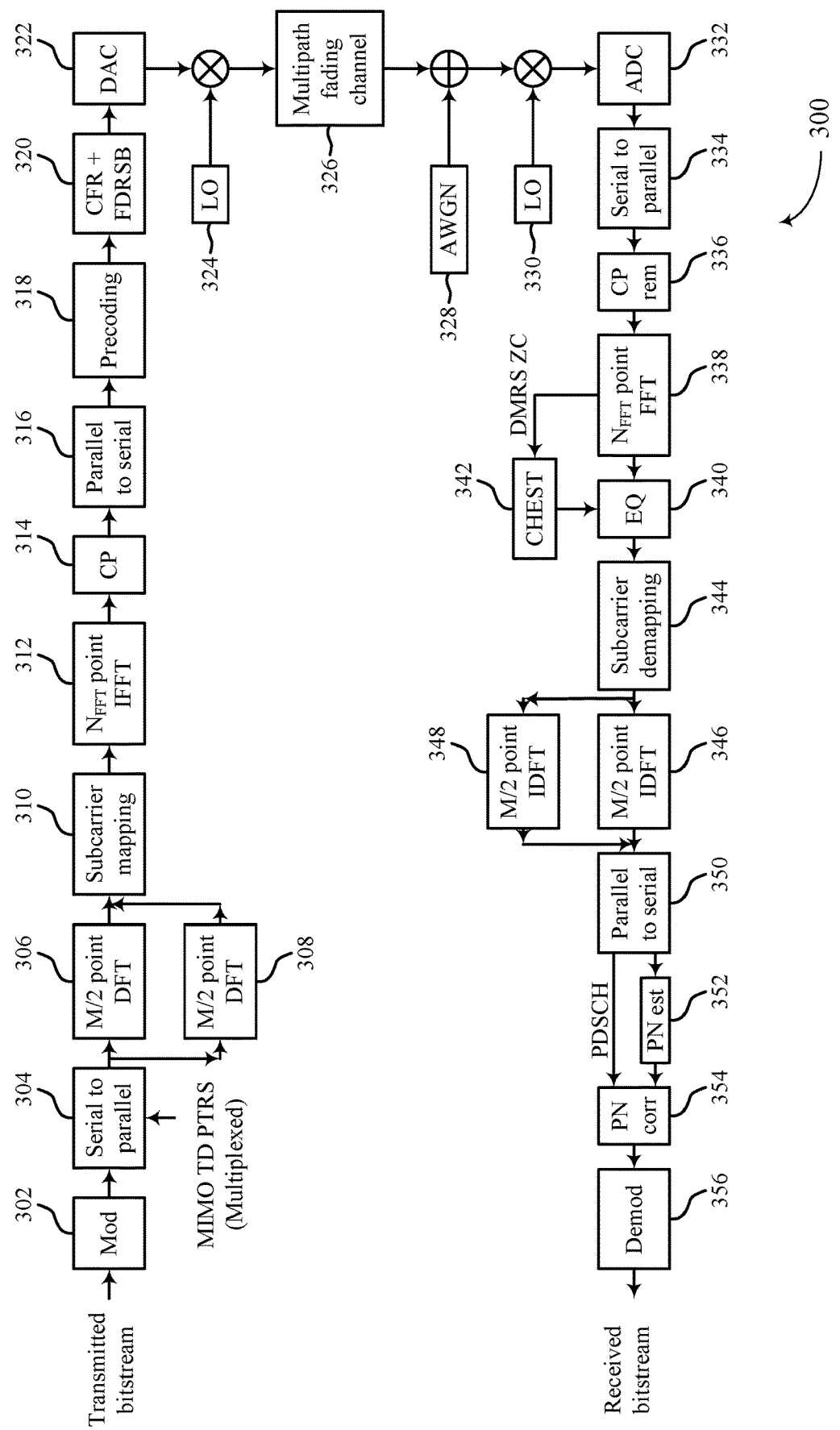
FIG. 3 illustrates an example of a block diagram of operations that support resource offset mapping for multiplexing in accordance with one or more aspects of the present disclosure.

FIG. 3 illustrates an example of a block diagram 300 of operations that support resource offset mapping for multiplexing in accordance with one or more aspects of the present disclosure.

At 302, a first wireless device (e.g., a UE 115 or a network entity 105) may identify symbols (e.g., M symbols) of a data stream for transmission (e.g., a transmitted bitstream), and the first wireless device may modulate the symbols of the data stream. At 304, the first wireless device may perform a serial to parallel conversion on the symbols of the data stream. In some examples, the symbols of the data stream may be multiplexed with phase tracking reference signals (PTRS) (e.g., MIMO time domain PTRS). At 306, the first wireless device may perform a first time-domain to frequency-domain transform (e.g., a DFT) on a first subset of the symbols of the data stream (e.g., M/2 symbols) to obtain a first set of frequency-domain symbols. At 308, the first wireless device may perform a second time-domain to frequency-domain transform (e.g., a DFT) on a second subset of the symbols of the data stream (e.g., M/2 symbols) to obtain a second set of frequency-domain symbols. At 310, the first wireless device may map the first set of frequency-domain symbols to a first subset of subcarriers of a set of subcarriers and the second set of frequency-domain symbols to a second subset of subcarriers of the set of subcarriers. A lowest subcarrier of the second subset of subcarriers may be separated from a highest subcarrier of the first subset of subcarriers by an offset. At 312, the first wireless device may perform a frequency-domain to time-domain transform (e.g., an inverse fast Fourier transform (IFFT)) on the mapped first set of frequency-domain symbols and the mapped second set of frequency-domain symbols to obtain a set of time-domain samples. At 314, the first wireless device may append a cyclic prefix (CP) to the set of time-domain samples. At 316, the first wireless device may perform a parallel to serial conversion on the set of time-domain samples. At 318, the first wireless device may precode the set of time-domain samples. At 320, the first wireless device may perform crest factor reduction (CFR) and FDRSB compensation on the set of time-domain samples. At 322, the first wireless device may perform a digital to analog conversion on the set of time-domain samples to generate signaling for transmission.

The first wireless device may then transmit the signaling obtained from the set of time-domain samples to a second wireless device (e.g., a UE 115 or a network entity 105). The first wireless device may modify the signaling with an LO 324 and transmit the signaling over a multipath fading channel 326 that introduces additive white Gaussian noise (AWGN) 328. The second wireless device may modify the signaling with an LO 330 and may receive the signaling from the first wireless device.

At 332, the second wireless device may perform an analog to digital conversion on the signaling received from the first wireless device. At 334, the second wireless device may perform a serial to parallel conversion on the signaling. At 336, the second wireless device may remove a cyclic prefix from the signaling. At 338, the second wireless device may perform a time-domain to frequency-domain transform (e.g., a fast Fourier transform (FFT)) on the signaling to obtain frequency-domain symbols (e.g., M symbols). At 340, the second wireless device may equalize the frequency-domain symbols. At 342, the second wireless device may perform channel estimation using at least a portion of the frequency-domain symbols (e.g., on the DMRSs with a Zadoff-Chu (ZC) sequence). At 344, the second wireless device may de-map a first set of the frequency-domain symbols from a first subset of subcarriers of a set of subcarriers and a second set of the frequency-domain symbols from a second subset of subcarriers of the set of subcarriers. A lowest subcarrier of the second subset of subcarriers may be separated from a highest subcarrier of the first subset of subcarriers by an offset. At 346, the second wireless device may perform a first frequency-domain to time-domain transform (e.g., an IDFT) on the de-mapped first set of frequency-domain symbols (e.g., M/2 symbols) to obtain a first set of time-domain symbols. At 348, the second wireless device may perform a second frequency-domain to time-domain transform (e.g., an IDFT) on the de-mapped second set of frequency-domain symbols (e.g., M/2 symbols) to obtain a second set of time-domain symbols. At 350, the second wireless device may perform a parallel to serial conversion on the first set of time-domain symbols and the second set of time-domain symbols. At 352, the second wireless device may perform phase noise (PN) estimation. At 354, the second wireless device may use the phase noise estimation to perform phase noise correlation on the first set of time-domain symbols and the second set of time-domain symbols (e.g., a PDSCH). At 356, the second wireless device may demodulate the first set of time-domain symbols and the second set of time-domain symbols to obtain a data stream (e.g., a received bitstream).

Figure 4:
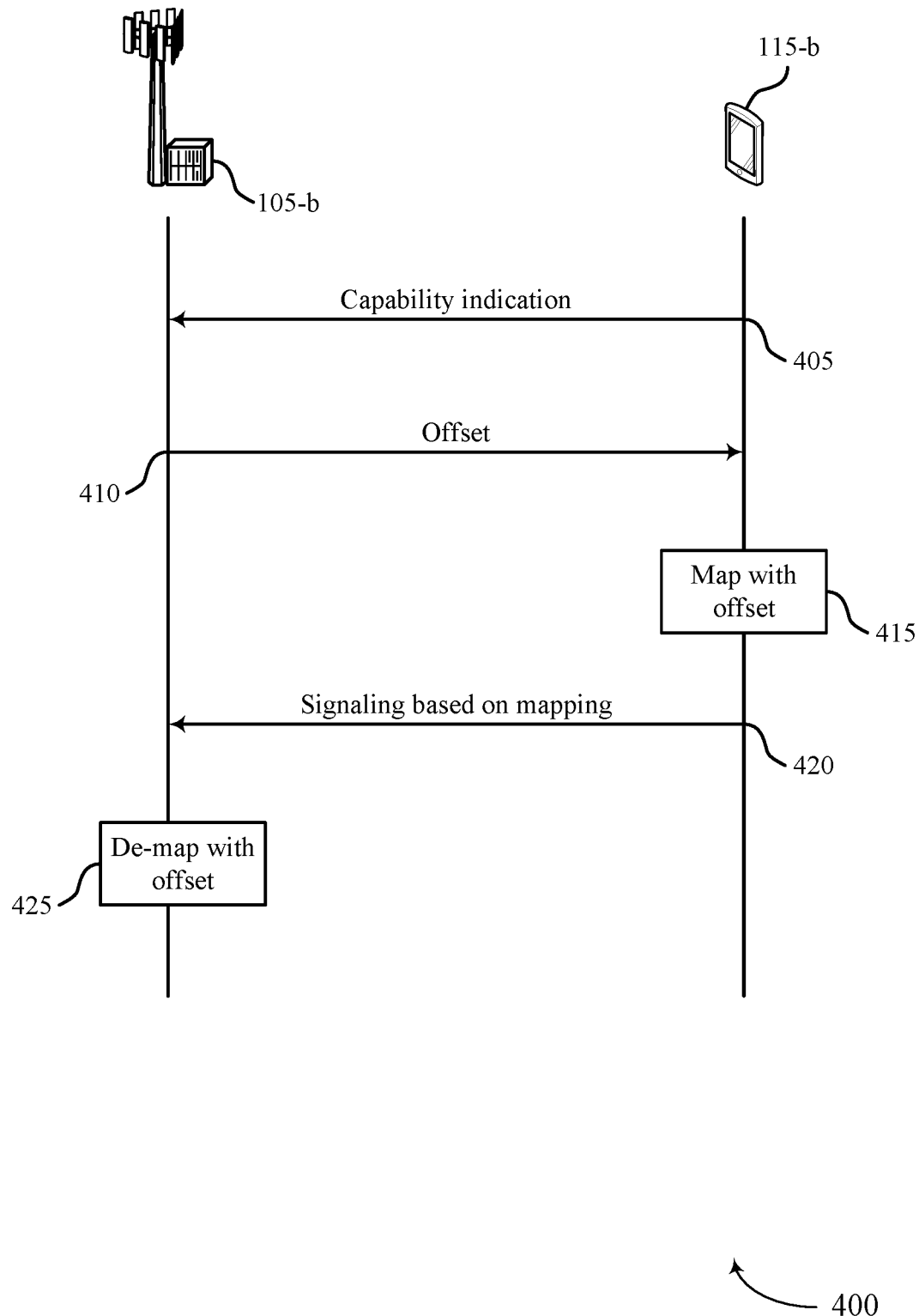
FIG. 4 illustrates an example of a process flow that supports resource offset mapping for multiplexing in accordance with one or more aspects of the present disclosure.

FIG. 4 illustrates an example of a process flow 400 that supports resource offset mapping for multiplexing in accordance with one or more aspects of the present disclosure. The process flow 400 includes a network entity 105-*b*, which may be an example of a network entity 105 described with reference to FIGS. 1-3. The process flow 400 also includes a UE 115-*b*, which may be an example of a UE 115 described with reference to FIGS. 1-3. The process flow 400 may implement aspects of the wireless communications system 100 or the wireless communications system 200. For instance, the process flow 400 may support efficient techniques for mitigating or eliminating the effects of LO leakage, spurs, or other errors during wireless communications.

In the following description of the process flow 400, the signaling exchanged between the UE 115-*b* and the network entity 105-*b* may be exchanged in a different order than the example order shown, or the operations performed by the UE 115-*b* and the network entity 105-*b* may be performed in different orders or at different times. Some operations may also be omitted from the process flow 400, and other operations may be added to the process flow 400.

A high value described herein may correspond to a value satisfying a threshold or failing to satisfy a threshold, and a low value described herein may also correspond to a value satisfying a threshold or failing to satisfy a threshold. Satisfying a threshold or failing to satisfy a threshold may, depending on the context, refer to a value being greater than the threshold, greater than or equal to the threshold, less than the threshold, less than or equal to the threshold, equal to the threshold, not equal to the threshold, or the like.

At 405, the UE 115-b may transmit, and the network entity 105-b may receive, a capability indication indicating one or more capabilities associated with resource offset mapping. In one example, the capability indication may indicate that the UE 115-b is capable of mapping frequency-domain symbols to or de-mapping frequency-domain symbols from different subsets of subcarriers separated by one or more offsets (e.g., capable of supporting resource offset mapping). In another example, the capability indication may indicate a quantity of different subsets of subcarriers to which the UE 115-b is capable of mapping frequency-domain symbols or from which the UE 115-b is capable of de-mapping frequency-domain symbols (e.g., a quantity of offsets supported by the UE 115-b). In yet another example, the capability indication may indicate one or more locations at which the UE 115-b or the network entity 105-b is to divide a set of subcarriers into different subsets of subcarriers for mapping frequency-domain symbols.

At 410, the network entity 105-b may transmit, and the UE 115-b may receive, an indication of an offset between subsets of subcarriers for the UE 115-b to use for resource mapping. The offset may be within a set of subcarriers including the first subset of subcarriers and the second subset of subcarriers. In some examples, the network entity 105-b may transmit, and the UE 115-b may receive downlink control information (DCI) allocating the set of subcarriers for an uplink transmission from the UE 115-b. The network entity 105-b may also transmit, and the UE 115-b may receive, an indication of the offset with the allocation of the set of subcarriers. The offset may be indicated using an identifier of a first subcarrier (e.g., or resource element) and a quantity of subcarriers after or before the first subcarrier. Thus, the offset may correspond to a gap between the first subset of subcarriers and the second subset of subcarriers, and the UE 115-b may avoid mapping frequency-domain symbols to subcarriers in the gap. For example, the network entity 105-b may indicate a first offset of two subcarriers starting at resource number 6 and a second offset of two subcarriers starting at resource number 33, and the UE 115-b may avoid mapping frequency-domain symbols to resources 6 and 7 and resources 33 and 34 in a set of resources allocated to the UE 115-b.

At 415, the UE 115-b may map frequency-domain symbols to a set of resources based on the offset received at 410. The UE 115-b may perform a first time-domain to frequency-domain transform on a first subset of symbols of a set of symbols of a data stream to obtain a first set of frequency-domain symbols and a second time-domain to frequency-domain transform on a second subset of symbols of the set of symbols of the data stream to obtain a second set of frequency-domain symbols. The UE 115-b may map the first set of frequency-domain symbols to a first subset of subcarriers of a set of subcarriers and the second set of frequency-domain symbols to a second subset of subcarriers of the set of subcarriers. A lowest subcarrier of the second subset of subcarriers may be separated from a highest subcarrier of the first subset of subcarriers by the offset received at 410. The UE 115-b may perform a frequency-domain to time-domain transform on the mapped first set of frequency-domain symbols and the mapped second set of frequency-domain symbols to obtain a set of time-domain samples.

At 420, the UE 115-b may transmit signaling obtained from the set of time-domain samples (e.g., based on the mapping at 415) to the network entity 105-b.

At 425, the network entity 105-b may perform a time-domain to frequency-domain transform on the signaling received from the UE 115-b to obtain frequency-domain symbols. The network entity 105-b may de-map a first set of the frequency-domain symbols from a first subset of subcarriers of a set of subcarriers and a second set of the frequency-domain symbols from a second subset of subcarriers of the set of subcarriers. A lowest subcarrier of the second subset of subcarriers may be separated from a highest subcarrier of the first subset of subcarriers by the offset transmitted at 410. The network entity 105-b may perform a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The network entity 105-b may then demodulate the first set of time-domain symbols and the second set of time-domain symbols to obtain a data stream.

In some examples, the network entity 105-b may transmit, and the UE 115-b may receive, an indication for the UE 115-b to perform the mapping using the offset (e.g., to perform resource offset mapping). The UE 115-b may transmit, and the network entity 105-b may receive, a request to perform the mapping using the offset, and the network entity 105-b may transmit, and the UE 115-b may receive, the indication to perform the mapping using the offset in response to the request. The network entity 105-b may transmit, and the UE 115-b may receive, reference signals, and the UE 115-b may determine, based on the reference signals, an impact of leakage on an SNR for subcarriers. The impact may determine whether the SNR for the subcarriers falls below a threshold. The UE 115-b may transmit the request to perform the mapping using the offset based on the impact satisfying a threshold or based on the SNR failing to satisfy a threshold. In some examples, the UE 115-b may transmit the request to perform the mapping using the offset based on an MCS satisfying a threshold (e.g., since other techniques may not be sufficient to cancel or mitigate the distortion on a set of subcarriers carrying symbols with a high MCS).

In some examples, the UE 115-b may transmit, and the network entity 105-b may receive, an indication that the UE 115-b is to perform the mapping using the offset (e.g., to perform resource offset mapping). The network entity 105-b may transmit, and the UE 115-b may receive, a request for the UE 115-b to perform the mapping using the offset, and the UE 115-b may transmit, and the network entity 105-b may receive, the indication that the UE 115-b is to perform the mapping using the offset in response to the request. The UE 115-b may transmit, and the network entity 105-b may receive, reference signals, and the network entity 105-b may determine, based on the reference signals, an impact of leakage on an SNR for subcarriers. The impact may determine whether the SNR for the subcarriers falls below a threshold. The network entity 105-b may transmit the request to perform the mapping using the offset based on the impact satisfying a threshold or based on the SNR failing to satisfy a threshold. In some examples, the network entity 105-*b* may transmit the request to perform the mapping using the offset based on an MCS satisfying a threshold (e.g., since other techniques may not be sufficient to cancel or mitigate the distortion on a set of subcarriers carrying symbols with a high MCS).

In some examples, the network entity 105-*b* may transmit, and the UE 115-*b* may receive, an indication to perform a mapping without an offset (e.g., to map frequency-domain symbols to a contiguous set of subcarriers for a subsequent data stream). The UE 115-*b* may transmit, and the network entity 105-*b* may receive, a request to perform the mapping without the offset, and the network entity 105-*b* may transmit, and the UE 115-*b* may receive, the indication to perform the mapping without the offset in response to the request. The network entity 105-*b* may transmit, and the UE 115-*b* may receive, reference signals, and the UE 115-*b* may determine, based on the reference signals, an impact of leakage on an SNR for subcarriers. The impact may determine whether the SNR for the subcarriers falls below a threshold. The UE 115-*b* may transmit the request to perform the mapping without the offset based on the impact failing to satisfy a threshold or based on the SNR satisfying a threshold. The UE 115-*b* may also transmit the request to perform the mapping without the offset based on an MCS failing to satisfy a threshold (e.g., since other techniques may be sufficient to cancel or mitigate the distortion on a set of subcarriers carrying symbols with a low MCS).

In some examples, the UE 115-*b* may transmit, and the network entity 105-*b* may receive, an indication to perform the mapping without the offset (e.g., to map frequency-domain symbols to a contiguous set of subcarriers for a subsequent data stream). The network entity 105-*b* may transmit, and the UE 115-*b* may receive, a request to perform the mapping without the offset, and the UE 115-*b* may transmit, and the network entity 105-*b* may receive, the indication to perform the mapping without the offset in response to the request. The UE 115-*b* may transmit, and the network entity 105-*b* may receive, reference signals, and the network entity 105-*b* may determine, based on the reference signals, an impact of leakage on an SNR for subcarriers. The impact may determine whether the SNR for the subcarriers falls below a threshold. The network entity 105-*b* may transmit the request to perform the mapping without the offset based on the impact failing to satisfy a threshold or based on the SNR satisfying a threshold. The network entity 105-*b* may also transmit the request to perform the mapping without the offset based on an MCS failing to satisfy a threshold (e.g., since other techniques may be sufficient to cancel or mitigate the distortion on a set of subcarriers carrying symbols with a low MCS).

Figure 5:
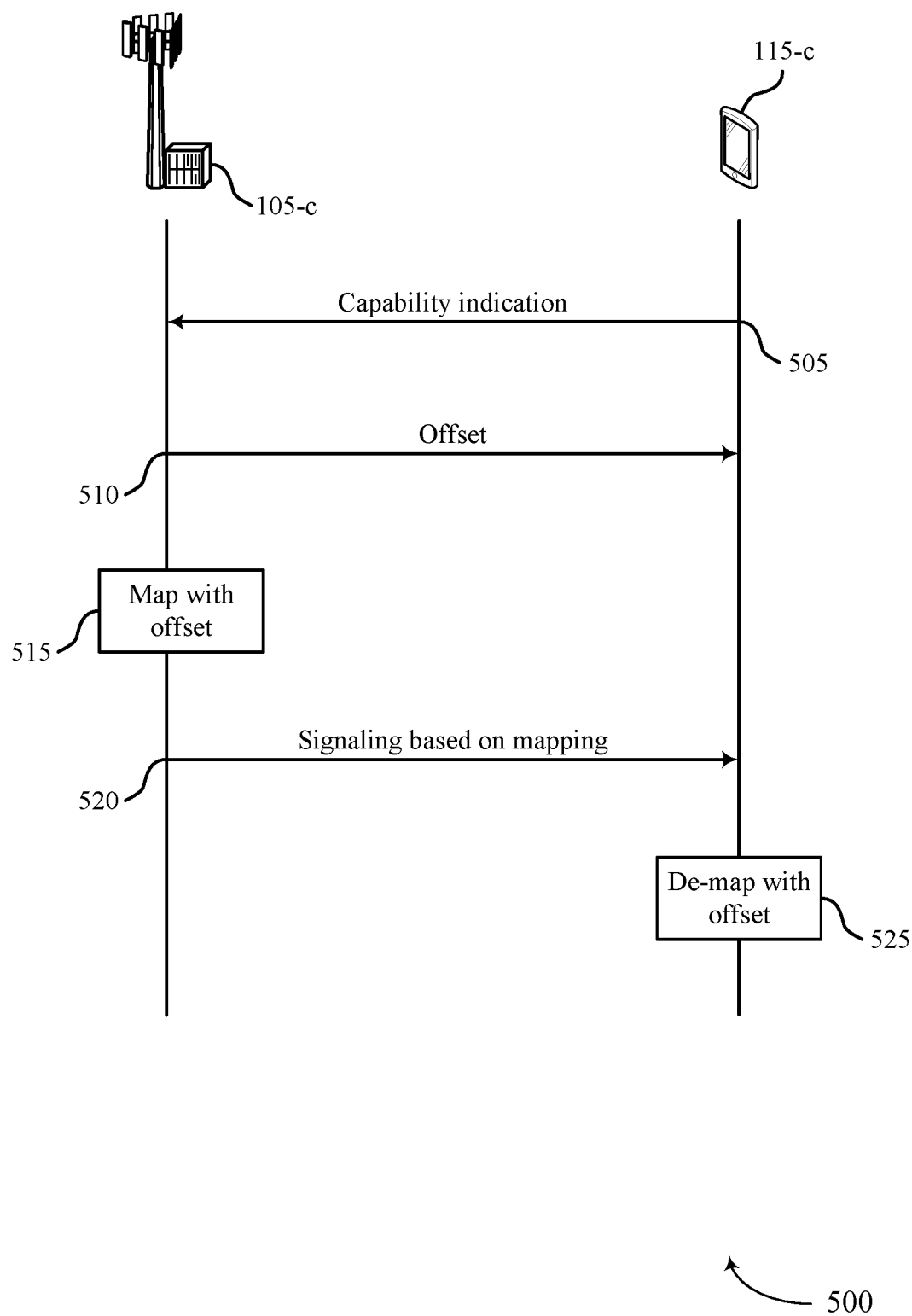
FIG. 5 illustrates an example of a process flow that supports resource offset mapping for multiplexing in accordance with one or more aspects of the present disclosure.

FIG. 5 illustrates an example of a process flow 500 that supports resource offset mapping for multiplexing in accordance with one or more aspects of the present disclosure. The process flow 500 includes a network entity 105-*c*, which may be an example of a network entity 105 described with reference to FIGS. 1-4. The process flow 500 also includes a UE 115-*c*, which may be an example of a UE 115 described with reference to FIGS. 1-4. The process flow 500 may implement aspects of the wireless communications system 100 or the wireless communications system 200. For instance, the process flow 500 may support efficient techniques for mitigating or eliminating the effects of LO leakage, spurs, or other errors during wireless communications.

In the following description of the process flow 500, the signaling exchanged between the UE 115-*c* and the network entity 105-*c* may be exchanged in a different order than the example order shown, or the operations performed by the UE 115-*c* and the network entity 105-*c* may be performed in different orders or at different times. Some operations may also be omitted from the process flow 500, and other operations may be added to the process flow 500.

A high value described herein may correspond to a value satisfying a threshold or failing to satisfy a threshold, and a low value described herein may also correspond to a value satisfying a threshold or failing to satisfy a threshold. Satisfying a threshold or failing to satisfy a threshold may, depending on the context, refer to a value being greater than the threshold, greater than or equal to the threshold, less than the threshold, less than or equal to the threshold, equal to the threshold, not equal to the threshold, or the like.

At 505, the UE 115-*c* may transmit, and the network entity 105-*c* may receive, a capability indication indicating one or more capabilities associated with resource offset mapping. In one example, the capability indication may indicate that the UE 115-*c* is capable of mapping frequency-domain symbols to or de-mapping frequency-domain symbols from different subsets of subcarriers separated by one or more offsets (e.g., capable of supporting resource offset mapping). In another example, the capability indication may indicate a quantity of different subsets of subcarriers to which the UE 115-*c* is capable of mapping frequency-domain symbols or from which the UE 115-*c* is capable of de-mapping frequency-domain symbols (e.g., a quantity of offsets supported by the UE 115-*c*). In yet another example, the capability indication may indicate one or more locations at which the UE 115-*c* or the network entity 105-*c* is to divide a set of subcarriers into different subsets of subcarriers for mapping frequency-domain symbols.

At 510, the network entity 105-*c* may transmit, and the UE 115-*c* may receive, an indication of an offset between subsets of subcarriers that the network entity 105-*c* may use for resource mapping. The offset may be within a set of subcarriers including the first subset of subcarriers and the second subset of subcarriers. In some examples, the network entity 105-*c* may transmit, and the UE 115-*c* may receive downlink control information (DCI) allocating the set of subcarriers for a downlink transmission from the network entity 105-*c*. The network entity 105-*c* may also transmit, and the UE 115-*c* may receive, an indication of the offset with the allocation of the set of subcarriers. The offset may be indicated using an identifier of a first subcarrier (e.g., or resource element) and a quantity of subcarriers after or before the first subcarrier. Thus, the offset may correspond to a gap between the first subset of subcarriers and the second subset of subcarriers, and the network entity 105-*c* may avoid mapping frequency-domain symbols to subcarriers in the gap. For example, the network entity 105-*c* may indicate a first offset of two subcarriers starting at resource number 6 and a second offset of two subcarriers starting at resource number 33, and the network entity 105-*c* may avoid mapping frequency-domain symbols to resources 6 and 7 and resources 33 and 34 in a set of resources allocated to the UE 115-*c*.

At 515, the network entity 105-*c* may map frequency-domain symbols to a set of resources based on the offset transmitted at 510. The network entity 105-*c* may perform a first time-domain to frequency-domain transform on a first subset of symbols of a set of symbols of a data stream to obtain a first set of frequency-domain symbols and a second time-domain to frequency-domain transform on a second subset of symbols of the set of symbols of the data stream to obtain a second set of frequency-domain symbols. The network entity 105-c may map the first set of frequency-domain symbols to a first subset of subcarriers of a set of subcarriers and the second set of frequency-domain symbols to a second subset of subcarriers of the set of subcarriers. A lowest subcarrier of the second subset of subcarriers may be separated from a highest subcarrier of the first subset of subcarriers by the offset transmitted at 510. The network entity 105-c may perform a frequency-domain to time-domain transform on the mapped first set of frequency-domain symbols and the mapped second set of frequency-domain symbols to obtain a set of time-domain samples.

At 520, the network entity 105-c may transmit signaling obtained from the set of time-domain samples (e.g., based on the mapping at 515) to the UE 115-c.

At 525, the UE 115-c may perform a time-domain to frequency-domain transform on the signaling received from the network entity 105-c to obtain frequency-domain symbols. The UE 115-c may de-map a first set of the frequency-domain symbols from a first subset of subcarriers of a set of subcarriers and a second set of the frequency-domain symbols from a second subset of subcarriers of the set of subcarriers. A lowest subcarrier of the second subset of subcarriers may be separated from a highest subcarrier of the first subset of subcarriers by the offset received at 510. The UE 115-c may perform a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The UE 115-c may then demodulate the first set of time-domain symbols and the second set of time-domain symbols to obtain a data stream.

In some examples, the network entity 105-c may transmit, and the UE 115-c may receive, an indication that the network entity 105-c is to perform the mapping using the offset (e.g., to perform resource offset mapping). The UE 115-c may transmit, and the network entity 105-c may receive, a request for the network entity 105-c to perform the mapping using the offset, and the network entity 105-c may transmit, and the UE 115-c may receive, the indication that the network entity 105-c is to perform the mapping using the offset in response to the request. The network entity 105-c may transmit, and the UE 115-c may receive, reference signals, and the UE 115-c may determine, based on the reference signals, an impact of leakage on an SNR for subcarriers. The impact may determine whether the SNR for the subcarriers falls below a threshold. The UE 115-c may transmit the request for the network entity 105-c to perform the mapping using the offset based on the impact satisfying a threshold or based on the SNR failing to satisfy a threshold. In some examples, the UE 115-c may transmit the request for the network entity 105-c to perform the mapping using the offset based on an MCS satisfying a threshold (e.g., since other techniques may not be sufficient to cancel or mitigate the distortion on a set of subcarriers carrying symbols with a high MCS).

In some examples, the UE 115-c may transmit, and the network entity 105-c may receive, an indication that the network entity 105-c is to perform the mapping using the offset (e.g., to perform resource offset mapping). The network entity 105-c may transmit, and the UE 115-c may receive, a request to perform the mapping using the offset, and the UE 115-c may transmit, and the network entity 105-c may receive, the indication that the network entity 105-c is to perform the mapping using the offset in response to the request. The UE 115-c may transmit, and the network entity 105-c may receive, reference signals, and the network entity 105-c may determine, based on the reference signals, an impact of leakage on an SNR for subcarriers. The impact may determine whether the SNR for the subcarriers falls below a threshold. The network entity 105-c may transmit the request to perform the mapping using the offset based on the impact satisfying a threshold or based on the SNR failing to satisfy a threshold. In some examples, the network entity 105-c may transmit the request to perform the mapping using the offset based on an MCS satisfying a threshold (e.g., since other techniques may not be sufficient to cancel or mitigate the distortion on a set of subcarriers carrying symbols with a high MCS).

In some examples, the network entity 105-c may transmit, and the UE 115-c may receive, an indication that the network entity 105-c is to perform a mapping without an offset (e.g., to map frequency-domain symbols to a contiguous set of subcarriers for a subsequent data stream). The UE 115-c may transmit, and the network entity 105-c may receive, a request for the network entity 105-c to perform the mapping without the offset, and the network entity 105-c may transmit, and the UE 115-c may receive, the indication that the network entity 105-c is to perform the mapping without the offset in response to the request. The network entity 105-c may transmit, and the UE 115-c may receive, reference signals, and the UE 115-c may determine, based on the reference signals, an impact of leakage on an SNR for subcarriers. The impact may determine whether the SNR for the subcarriers falls below a threshold. The UE 115-c may transmit the request for the network entity 105-c to perform the mapping without the offset based on the impact failing to satisfy a threshold or based on the SNR satisfying a threshold. The UE 115-c may also transmit the request for the network entity 105-c to perform the mapping without the offset based on an MCS failing to satisfy a threshold (e.g., since other techniques may be sufficient to cancel or mitigate the distortion on a set of subcarriers carrying symbols with a low MCS).

In some examples, the UE 115-c may transmit, and the network entity 105-c may receive, an indication that the network entity 105-c is to perform the mapping without the offset (e.g., to map frequency-domain symbols to a contiguous set of subcarriers for a subsequent data stream). The network entity 105-c may transmit, and the UE 115-c may receive, a request to perform the mapping without the offset, and the UE 115-c may transmit, and the network entity 105-c may receive, the indication that the network entity 105-c is to perform the mapping without the offset in response to the request. The UE 115-c may transmit, and the network entity 105-c may receive, reference signals, and the network entity 105-c may determine, based on the reference signals, an impact of leakage on an SNR for subcarriers. The impact may determine whether the SNR for the subcarriers falls below a threshold. The network entity 105-c may transmit the request to perform the mapping without the offset based on the impact failing to satisfy a threshold or based on the SNR satisfying a threshold. The network entity 105-c may also transmit the request to perform the mapping without the offset based on an MCS failing to satisfy a threshold (e.g., since other techniques may be sufficient to cancel or mitigate the distortion on a set of subcarriers carrying symbols with a low MCS).

Figure 6:
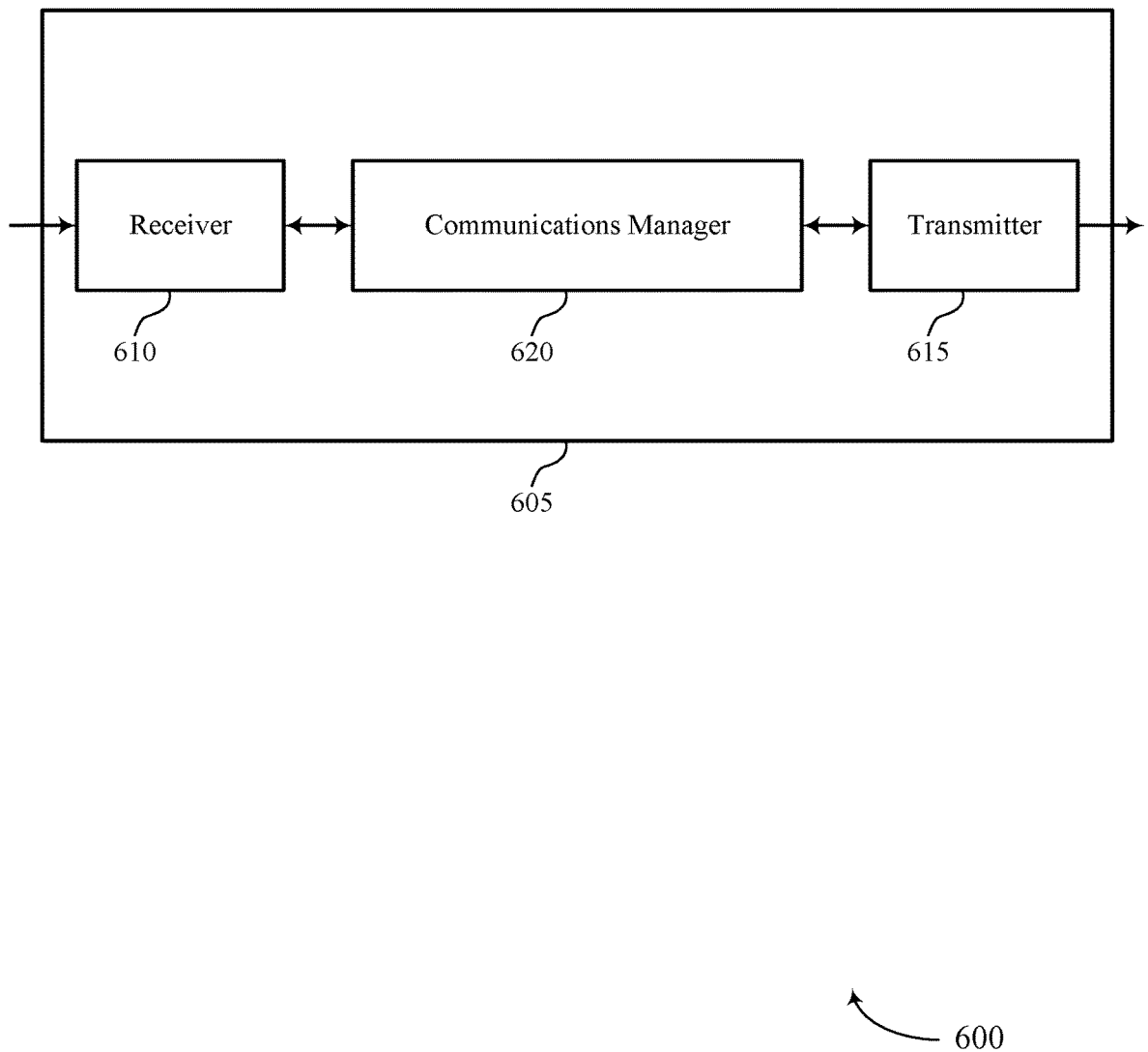
FIGS. 6 and 7 show block diagrams of devices that support resource offset mapping for multiplexing in accordance with one or more aspects of the present disclosure.

FIG. 6 shows a block diagram 600 of a device 605 that supports resource offset mapping for multiplexing in accordance with one or more aspects of the present disclosure.

The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource offset mapping for multiplexing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource offset mapping for multiplexing). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of resource offset mapping for multiplexing as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples as disclosed herein. For example, the communications manager 620 may be configured as or otherwise support a means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The communications manager 620 may be configured as or otherwise support a means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The communications manager 620 may be configured as or otherwise support a means for performing a frequency-domain to time-domain transform on the mapped first set of frequency-domain symbols and the mapped second set of frequency-domain symbols to obtain a set of time-domain samples. The communications manager 620 may be configured as or otherwise support a means for transmitting signaling obtained from the set of time-domain samples to a second wireless device.

Additionally, or alternatively, the communications manager 620 may support wireless communication at a first wireless device in accordance with examples as disclosed herein. For example, the communications manager 620 may be configured as or otherwise support a means for performing a time-domain to frequency-domain transform on signaling received from a second wireless device to obtain frequency-domain symbols. The communications manager 620 may be configured as or otherwise support a means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. The communications manager 620 may be configured as or otherwise support a means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The communications manager 620 may be configured as or otherwise support a means for demodulating the first set of time-domain symbols and the second set of time-domain symbols to obtain a data stream.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, or more efficient utilization of communication resources. Because the device 605 may avoid mapping frequency-domain symbols to or de-mapping frequency-domain symbols from resources exposed to high distortion, the device 605 may mitigate or eliminate the effects of LO leakage, spurs, or other errors during wireless communications. As a result, the quality of communications between the device 605 and another device may improve resulting in the reduced processing, reduced power consumption, or more efficient utilization of communication resources.

Figure 7:
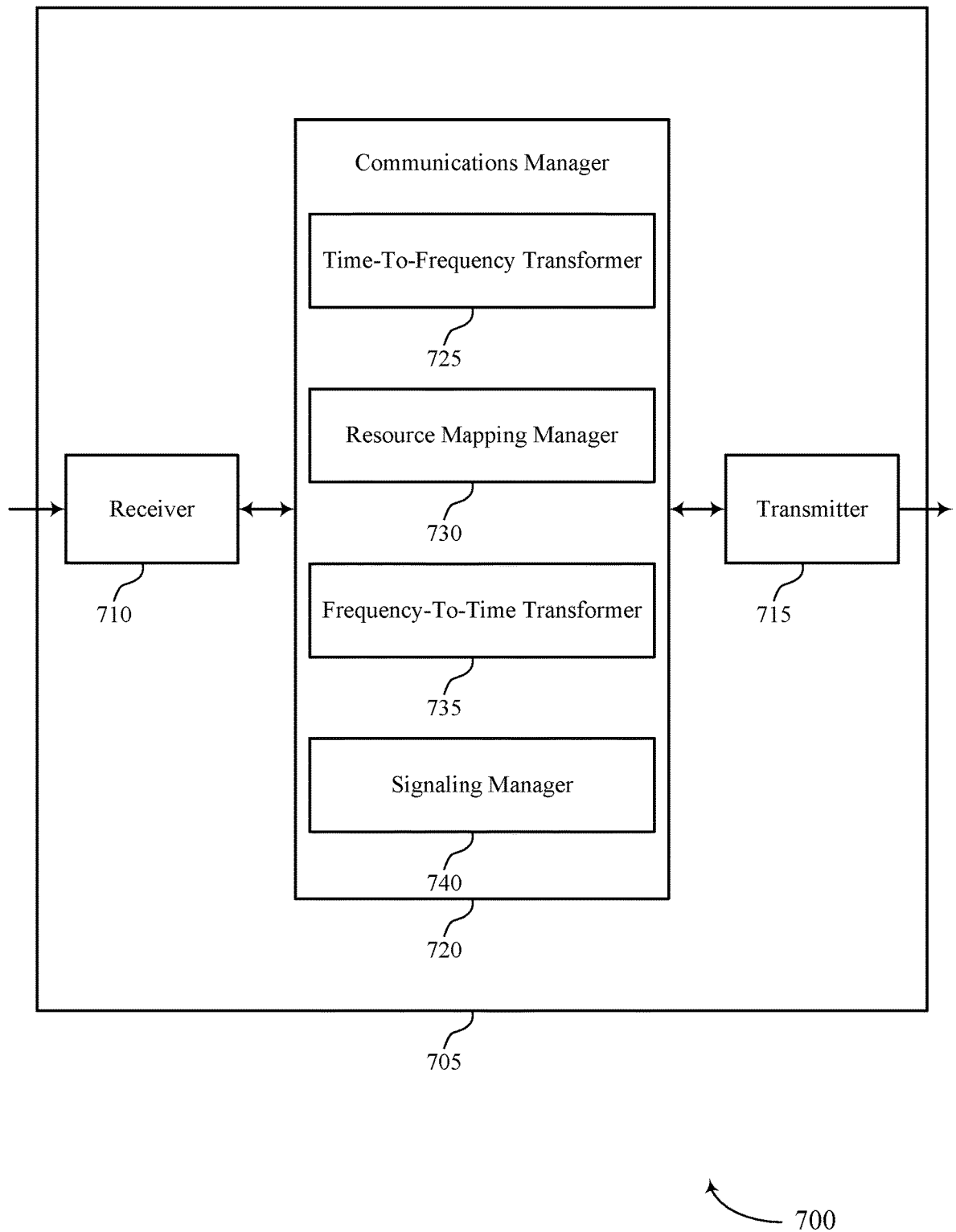

FIG. 7 shows a block diagram 700 of a device 705 that supports resource offset mapping for multiplexing in accordance with one or more aspects of the present disclosure. The device 705 may be an example of aspects of a device 605, a UE 115, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource offset mapping for multiplexing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource offset mapping for multiplexing). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of resource offset mapping for multiplexing as described herein. For example, the communications manager 720 may include a time-to-frequency transformer 725, a resource mapping manager 730, a frequency-to-time transformer 735, a signaling manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. The time-to-frequency transformer 725 may be configured as or otherwise support a means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The resource mapping manager 730 may be configured as or otherwise support a means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The frequency-to-time transformer 735 may be configured as or otherwise support a means for performing a frequency-domain to time-domain transform on the mapped first set of frequency-domain symbols and the mapped second set of frequency-domain symbols to obtain a set of time-domain samples. The signaling manager 740 may be configured as or otherwise support a means for transmitting signaling obtained from the set of time-domain samples to a second wireless device.

Additionally, or alternatively, the communications manager 720 may support wireless communication at a first wireless device in accordance with examples as disclosed herein. The time-to-frequency transformer 725 may be configured as or otherwise support a means for performing a time-domain to frequency-domain transform on signaling received from a second wireless device to obtain frequency-domain symbols. The resource mapping manager 730 may be configured as or otherwise support a means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. The frequency-to-time transformer 735 may be configured as or otherwise support a means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The signaling manager 740 may be configured as or otherwise support a means for demodulating the first set of time-domain symbols and the second set of time-domain symbols to obtain a data stream.

Figure 8:
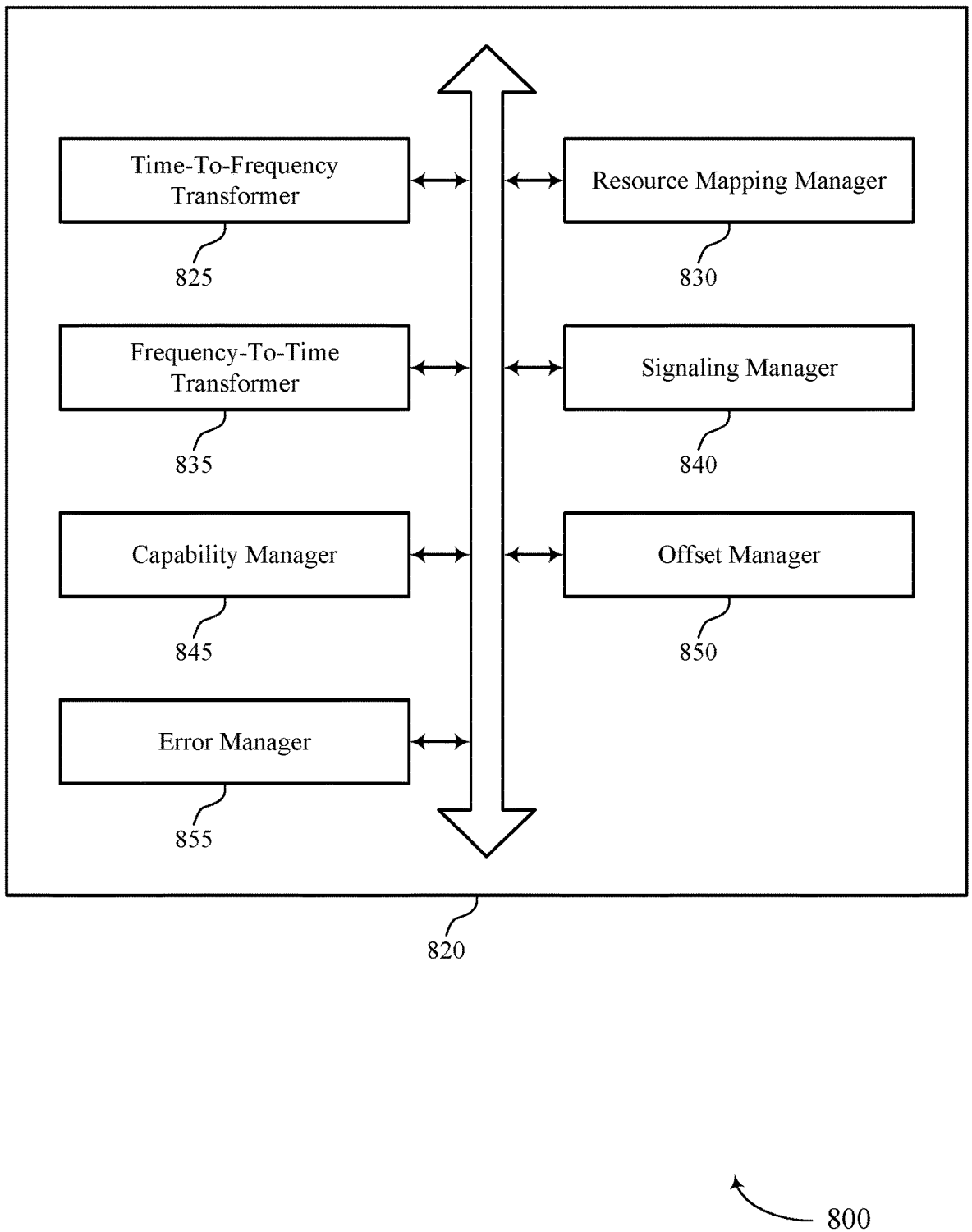
FIG. 8 shows a block diagram of a communications manager that supports resource offset mapping for multiplexing in accordance with one or more aspects of the present disclosure.

FIG. 8 shows a block diagram 800 of a communications manager 820 that supports resource offset mapping for multiplexing in accordance with one or more aspects of the present disclosure. The communications manager 820 may be an example of aspects of a communications manager 620, a communications manager 720, or both, as described herein. The communications manager 820, or various components thereof, may be an example of means for performing various aspects of resource offset mapping for multiplexing as described herein. For example, the communications manager 820 may include a time-to-frequency transformer 825, a resource mapping manager 830, a frequency-to-time transformer 835, a signaling manager 840, a capability manager 845, an offset manager 850, an error manager 855, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication at a first wireless device in accordance with examples as disclosed herein. The time-to-frequency transformer 825 may be configured as or otherwise support a means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The resource mapping manager 830 may be configured as or otherwise support a means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The frequency-to-time transformer 835 may be configured as or otherwise support a means for performing a frequency-domain to time-domain transform on the mapped first set of frequency-domain symbols and the mapped second set of frequency-domain symbols to obtain a set of time-domain samples. The signaling manager 840 may be configured as or otherwise support a means for transmitting signaling obtained from the set of time-domain samples to a second wireless device.

In some examples, the capability manager 845 may be configured as or otherwise support a means for transmitting a capability indication indicating that the first wireless device is capable of mapping frequency-domain symbols to different subsets of subcarriers separated by one or more offsets, where mapping the first set of frequency-domain symbols to the first subset of subcarriers and the second set of frequency-domain symbols to the second subset of subcarriers is based on transmitting the capability indication.

In some examples, the capability manager 845 may be configured as or otherwise support a means for receiving a capability indication indicating that the second wireless device is capable of de-mapping frequency-domain symbols from different subsets of subcarriers separated by one or more offsets, where mapping the first set of frequency-domain symbols to the first subset of subcarriers and the second set of frequency-domain symbols to the second subset of subcarriers is based on receiving the capability indication.

In some examples, the capability manager 845 may be configured as or otherwise support a means for transmitting a capability indication indicating a quantity of different subsets of subcarriers to which the first wireless device is capable of mapping frequency-domain symbols, where mapping the first set of frequency-domain symbols to the first subset of subcarriers and the second set of frequency-domain symbols to the second subset of subcarriers is based on the capability indication indicating that the first wireless device is capable of mapping frequency-domain symbols to at least two different subsets of subcarriers.

In some examples, the capability manager 845 may be configured as or otherwise support a means for receiving a capability indication indicating a quantity of different subsets of subcarriers from which the second wireless device is capable of de-mapping frequency-domain symbols, where mapping the first set of frequency-domain symbols to the first subset of subcarriers and the second set of frequency-domain symbols to the second subset of subcarriers is based on the capability indication indicating that the second wireless device is capable of de-mapping frequency-domain symbols from at least two different subsets of subcarriers.

In some examples, the capability manager 845 may be configured as or otherwise support a means for communicating an indication of one or more locations at which the first wireless device is to divide a set of subcarriers into different subsets of subcarriers for mapping frequency-domain symbols, where the set of multiple subcarriers is divided at one of the one or more locations into the first subset of subcarriers to which the first set of frequency-domain symbols are mapped and the second subset of subcarriers to which the second set of frequency-domain symbols are mapped.

In some examples, the offset manager 850 may be configured as or otherwise support a means for communicating an indication of the offset between the lowest subcarrier of the second subset of subcarriers and the highest subcarrier of the first subset of subcarriers, where mapping the first set of frequency-domain symbols to the first subset of subcarriers and the second set of frequency-domain symbols to the second subset of subcarriers is based on communicating the indication of the offset.

In some examples, the resource mapping manager 830 may be configured as or otherwise support a means for communicating an indication of mapping the first set of frequency-domain symbols to the first subset of subcarriers and the second set of frequency-domain symbols to the second subset of subcarriers, where mapping the first set of frequency-domain symbols to the first subset of subcarriers and the second set of frequency-domain symbols to the second subset of subcarriers is based on communicating the indication.

In some examples, the resource mapping manager 830 may be configured as or otherwise support a means for communicating a request to map the first set of frequency-domain symbols to the first subset of subcarriers and the second set of frequency-domain symbols to the second subset of subcarriers, where communicating the indication is based on communicating the request.

In some examples, the error manager 855 may be configured as or otherwise support a means for determining, based on reference signals received from the second wireless device, an impact of leakage on a signal-to-noise ratio for subcarriers between the first subset of subcarriers and the second subset of subcarriers, where communicating the request is based on the impact of the leakage satisfying a threshold.

In some examples, the resource mapping manager 830 may be configured as or otherwise support a means for communicating an indication to map other frequency-domain symbols to a contiguous set of subcarriers for a subsequent data stream. In some examples, the resource mapping manager 830 may be configured as or otherwise support a means for mapping the other frequency-domain symbols to the contiguous set of subcarriers for the subsequent data stream based on communicating the indication.

In some examples, the resource mapping manager 830 may be configured as or otherwise support a means for communicating a request to map the other frequency-domain symbols to the contiguous set of subcarriers for the subsequent data stream, where communicating the indication is based on communicating the request.

In some examples, the error manager 855 may be configured as or otherwise support a means for determining, based on reference signals received from the second wireless device, an impact of leakage on a signal-to-noise ratio on a subset of the contiguous set of subcarriers, where communicating the request is based on the impact of the leakage failing to satisfy a threshold.

Additionally, or alternatively, the communications manager 820 may support wireless communication at a first wireless device in accordance with examples as disclosed herein. In some examples, the time-to-frequency transformer 825 may be configured as or otherwise support a means for performing a time-domain to frequency-domain transform on signaling received from a second wireless device to obtain frequency-domain symbols. In some examples, the resource mapping manager 830 may be configured as or otherwise support a means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. In some examples, the frequency-to-time transformer 835 may be configured as or otherwise support a means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. In some examples, the signaling manager 840 may be configured as or otherwise support a means for demodulating the first set of time-domain symbols and the second set of time-domain symbols to obtain a data stream.

In some examples, the capability manager 845 may be configured as or otherwise support a means for transmitting a capability indication indicating that the first wireless device is capable of de-mapping frequency-domain symbols from different subsets of subcarriers separated by one or more offsets, where de-mapping the first set of frequency-domain symbols from the first subset of subcarriers and the second set of frequency-domain symbols from the second subset of subcarriers is based on transmitting the capability indication.

In some examples, the capability manager 845 may be configured as or otherwise support a means for receiving a capability indication indicating that the second wireless device is capable of mapping frequency-domain symbols to different subsets of subcarriers separated by one or more offsets, where de-mapping the first set of frequency-domain symbols from the first subset of subcarriers and the second set of frequency-domain symbols from the second subset of subcarriers is based on receiving the capability indication.

In some examples, the capability manager 845 may be configured as or otherwise support a means for transmitting a capability indication indicating a quantity of different subsets of subcarriers from which the first wireless device is capable of de-mapping frequency-domain symbols, where de-mapping the first set of frequency-domain symbols from the first subset of subcarriers and the second set of frequency-domain symbols from the second subset of subcarriers is based on the capability indication indicating that the first wireless device is capable of de-mapping frequency-domain symbols from at least two different subsets of subcarriers.

In some examples, the capability manager 845 may be configured as or otherwise support a means for receiving a capability indication indicating a quantity of different subsets of subcarriers to which the second wireless device is capable of mapping frequency-domain symbols, where de-mapping the first set of frequency-domain symbols from the first subset of subcarriers and the second set of frequency-domain symbols from the second subset of subcarriers is based on the capability indication indicating that the second wireless device is capable of mapping frequency-domain symbols to at least two different subsets of subcarriers.

In some examples, the capability manager 845 may be configured as or otherwise support a means for communicating an indication of one or more locations at which the first wireless device is to divide a set of subcarriers into different subsets of subcarriers for de-mapping frequency-domain symbols, where the set of multiple subcarriers is divided at one of the one or more locations into the first subset of subcarriers from which the first set of frequency-domain symbols are de-mapped and the second subset of subcarriers from which the second set of frequency-domain symbols are de-mapped.

In some examples, the offset manager 850 may be configured as or otherwise support a means for communicating an indication of the offset between the lowest subcarrier of the second subset of subcarriers and the highest subcarrier of the first subset of subcarriers, where de mapping the first set of frequency-domain symbols from the first subset of subcarriers and the second set of frequency-domain symbols from the second subset of subcarriers is based on communicating the indication of the offset.

In some examples, the resource mapping manager 830 may be configured as or otherwise support a means for communicating an indication to de-map the first set of frequency-domain symbols from the first subset of subcarriers and the second set of frequency-domain symbols from the second subset of subcarriers, where de-mapping the first set of frequency-domain symbols from the first subset of subcarriers and the second set of frequency-domain symbols from the second subset of subcarriers is based on communicating the indication.

In some examples, the resource mapping manager 830 may be configured as or otherwise support a means for communicating a request for the second wireless device to map the first set of frequency-domain symbols to the first subset of subcarriers and the second set of frequency-domain symbols to the second subset of subcarriers, where communicating the indication is based on communicating the request.

In some examples, the error manager 855 may be configured as or otherwise support a means for determining, based on reference signals received from the second wireless device, an impact of leakage on a signal-to-noise ratio on subcarriers between the first subset of subcarriers and the second subset of subcarriers, where communicating the request is based on the impact of the leakage satisfying a threshold.

In some examples, the resource mapping manager 830 may be configured as or otherwise support a means for communicating an indication to de-map other frequency-domain symbols from a contiguous set of subcarriers for a subsequent data stream. In some examples, the resource mapping manager 830 may be configured as or otherwise support a means for de-mapping the other frequency-domain symbols from the contiguous set of subcarriers for the subsequent data stream based on communicating the indication.

In some examples, the resource mapping manager 830 may be configured as or otherwise support a means for communicating a request for the second wireless device to map the other frequency-domain symbols to the contiguous set of subcarriers for the subsequent data stream, where receiving the indication is based on communicating the request.

In some examples, the error manager 855 may be configured as or otherwise support a means for determining, based on reference signals received from the second wireless device, an impact of leakage on a signal-to-noise ratio on a subset of the contiguous set of subcarriers, where communicating the request is based on the impact of the leakage failing to satisfy a threshold.

Figure 9:
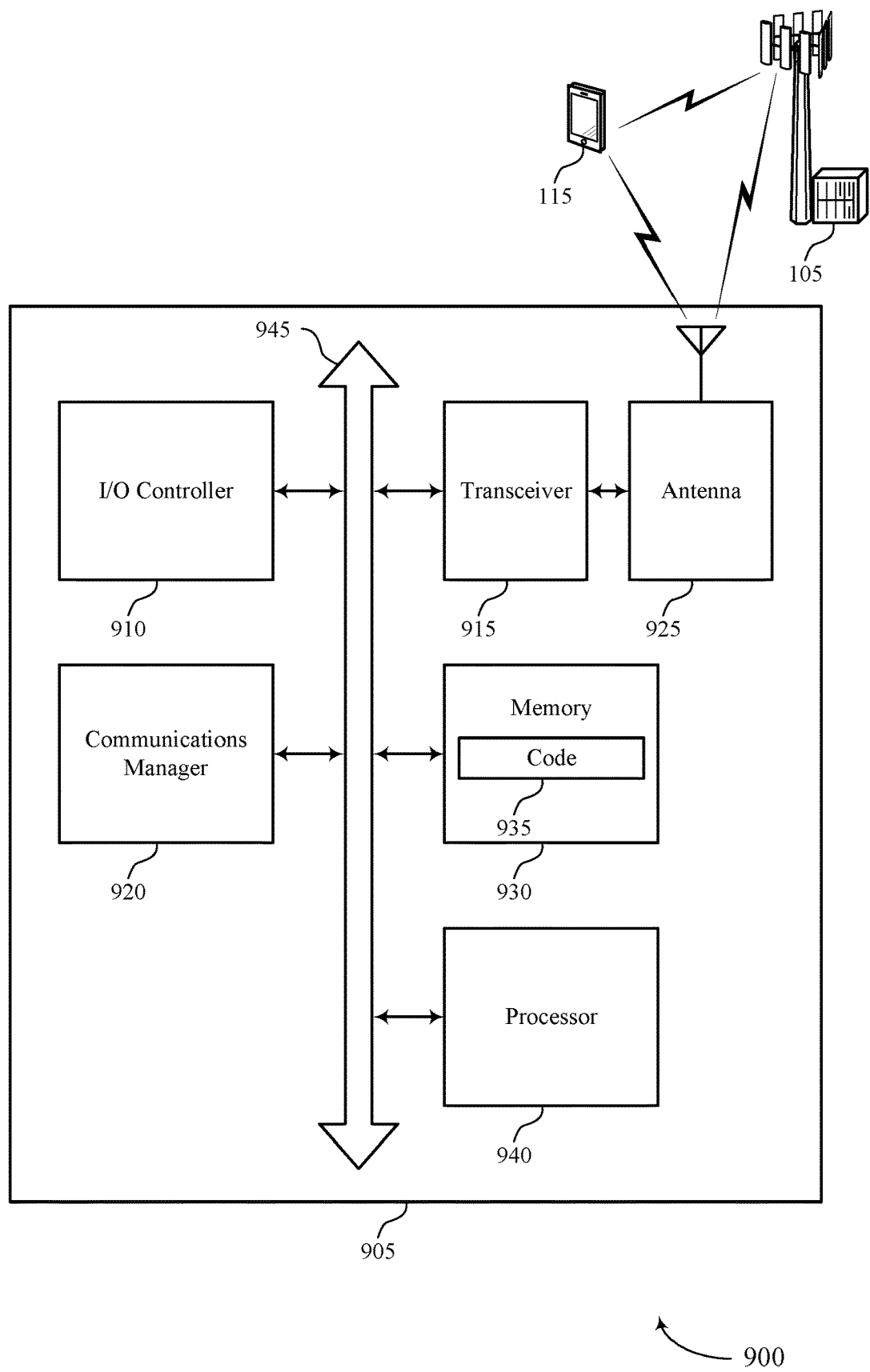
FIG. 9 shows a diagram of a system including a network entity that supports resource offset mapping for multiplexing in accordance with one or more aspects of the present disclosure.

FIG. 9 shows a diagram of a system 900 including a device 905 that supports resource offset mapping for multiplexing in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting resource offset mapping for multiplexing). For example, the device 905 or a component of the device 905 may include a processor 940 and memory 930 coupled with or to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The communications manager 920 may be configured as or otherwise support a means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The communications manager 920 may be configured as or otherwise support a means for performing a frequency-domain to time-domain transform on the mapped first set of frequency-domain symbols and the mapped second set of frequency-domain symbols to obtain a set of time-domain samples. The communications manager 920 may be configured as or otherwise support a means for transmitting signaling obtained from the set of time-domain samples to a second wireless device.

Additionally, or alternatively, the communications manager 920 may support wireless communication at a first wireless device in accordance with examples as disclosed herein. For example, the communications manager 920 may be configured as or otherwise support a means for performing a time-domain to frequency-domain transform on signaling received from a second wireless device to obtain frequency-domain symbols. The communications manager 920 may be configured as or otherwise support a means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. The communications manager 920 may be configured as or otherwise support a means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The communications manager 920 may be configured as or otherwise support a means for demodulating the first set of time-domain symbols and the second set of time-domain symbols to obtain a data stream.

By including or configuring the communications manager 920 in accordance with examples as described herein, the device 905 may support techniques for reduced processing, reduced power consumption, or more efficient utilization of communication resources. Because the device 905 may avoid mapping frequency-domain symbols to or de-mapping frequency-domain symbols from resources exposed to high distortion, the device 905 may mitigate or eliminate the effects of LO leakage, spurs, or other errors during wireless communications. As a result, the quality of communications between the device 905 and another device may improve resulting in the reduced processing, reduced power consumption, or more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of resource offset mapping for multiplexing as described herein, or the processor 940 and the memory 930 may be otherwise configured to perform or support such operations.

Figure 10:
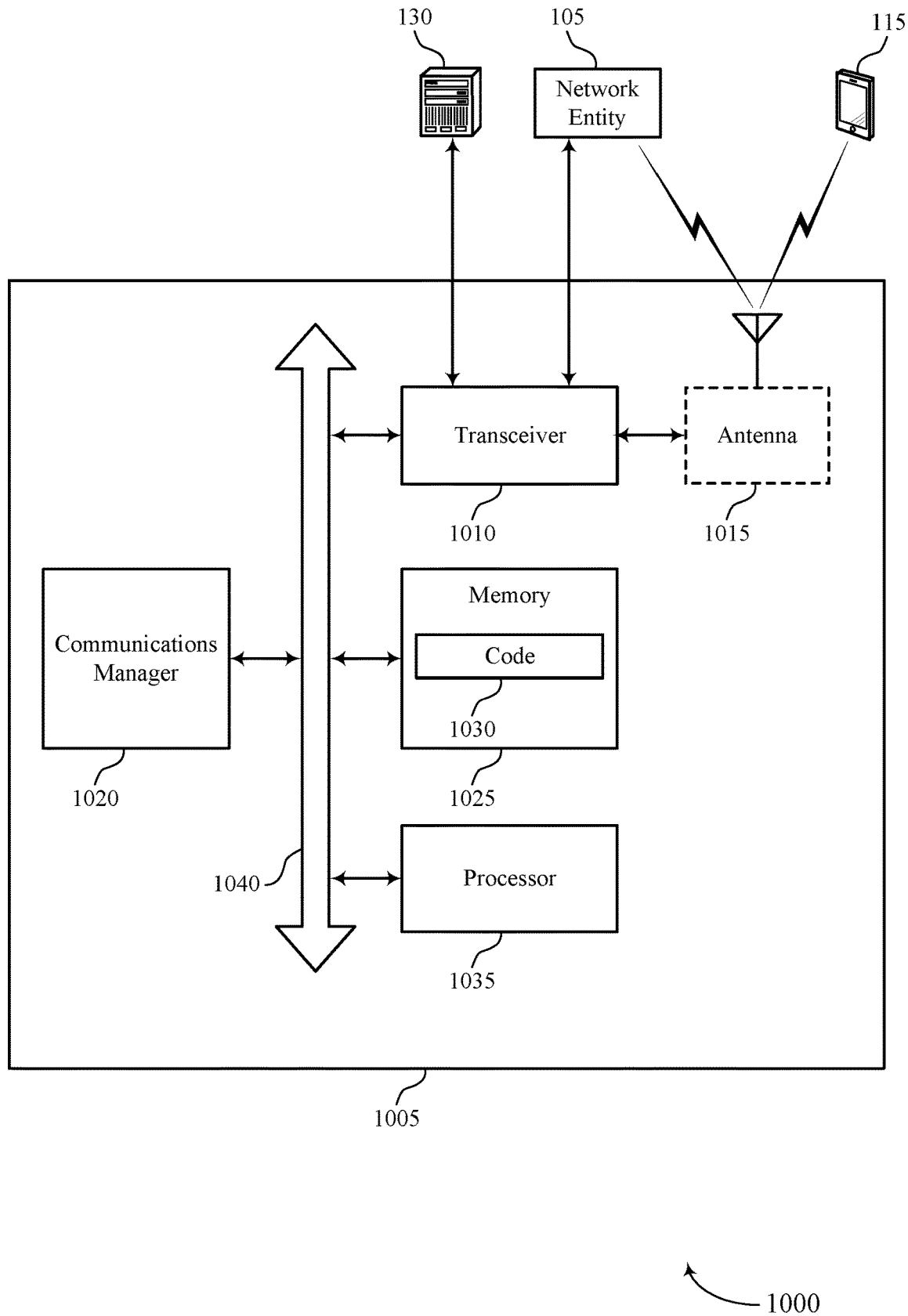
FIG. 10 shows a diagram of a system including a UE that supports resource offset mapping for multiplexing in accordance with one or more aspects of the present disclosure.

FIG. 10 shows a diagram of a system 1000 including a device 1005 that supports resource offset mapping for multiplexing in accordance with one or more aspects of the present disclosure. The device 1005 may be an example of or include the components of a device 605, a device 705, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or memory components (for example, the processor 1035, or the memory 1025, or both), may be included in a chip or chip assembly that is installed in the device 1005. The transceiver 1010, or the transceiver 1010 and one or more antennas 1015 or wired interfaces, where applicable, may be an example of a transmitter 615, a transmitter 715, a receiver 610, a receiver 710, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting resource offset mapping for multiplexing). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005. The processor 1035 may be any one or more suitable processors capable of executing scripts or instructions of one or more software programs stored in the device 1005 (such as within the memory 1025). In some implementations, the processor 1035 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1035, or the transceiver 1010, or the communications manager 1020, or other components or combinations of components of the device 1005. The processing system of the device 1005 may interface with other components of the device 1005, and may process information received from other components (such as inputs or signals) or output information to other components. For example, a chip or modem of the device 1005 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1005 may transmit information output from the chip or modem. In some implementations, the second interface may refer to an interface between the processing system of the chip or modem and a receiver, such that the device 1005 may obtain information or signal inputs, and the information may be passed to the processing system. A person having ordinary skill in the art will readily recognize that the first interface also may obtain information or signal inputs, and the second interface also may output information or signal outputs.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication at a first wireless device in accordance with examples as disclosed herein. For example, the communications manager 1020 may be configured as or otherwise support a means for performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The communications manager 1020 may be configured as or otherwise support a means for mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The communications manager 1020 may be configured as or otherwise support a means for performing a frequency-domain to time-domain transform on the mapped first set of frequency-domain symbols and the mapped second set of frequency-domain symbols to obtain a set of time-domain samples. The communications manager 1020 may be configured as or otherwise support a means for transmitting signaling obtained from the set of time-domain samples to a second wireless device.

Additionally, or alternatively, the communications manager 1020 may support wireless communication at a first wireless device in accordance with examples as disclosed herein. For example, the communications manager 1020 may be configured as or otherwise support a means for performing a time-domain to frequency-domain transform on signaling received from a second wireless device to obtain frequency-domain symbols. The communications manager 1020 may be configured as or otherwise support a means for de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. The communications manager 1020 may be configured as or otherwise support a means for performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The communications manager 1020 may be configured as or otherwise support a means for demodulating the first set of time-domain symbols and the second set of time-domain symbols to obtain a data stream.

By including or configuring the communications manager 1020 in accordance with examples as described herein, the device 1005 may support techniques for reduced processing, reduced power consumption, or more efficient utilization of communication resources. Because the device 1005 may avoid mapping frequency-domain symbols to or de-mapping frequency-domain symbols from resources exposed to high distortion, the device 1005 may mitigate or eliminate the effects of LO leakage, spurs, or other errors during wireless communications. As a result, the quality of communications between the device 1005 and another device may improve resulting in the reduced processing, reduced power consumption, or more efficient utilization of communication resources.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of resource offset mapping for multiplexing as described herein, or the processor 1035 and the memory 1025 may be otherwise configured to perform or support such operations.

Figure 11:
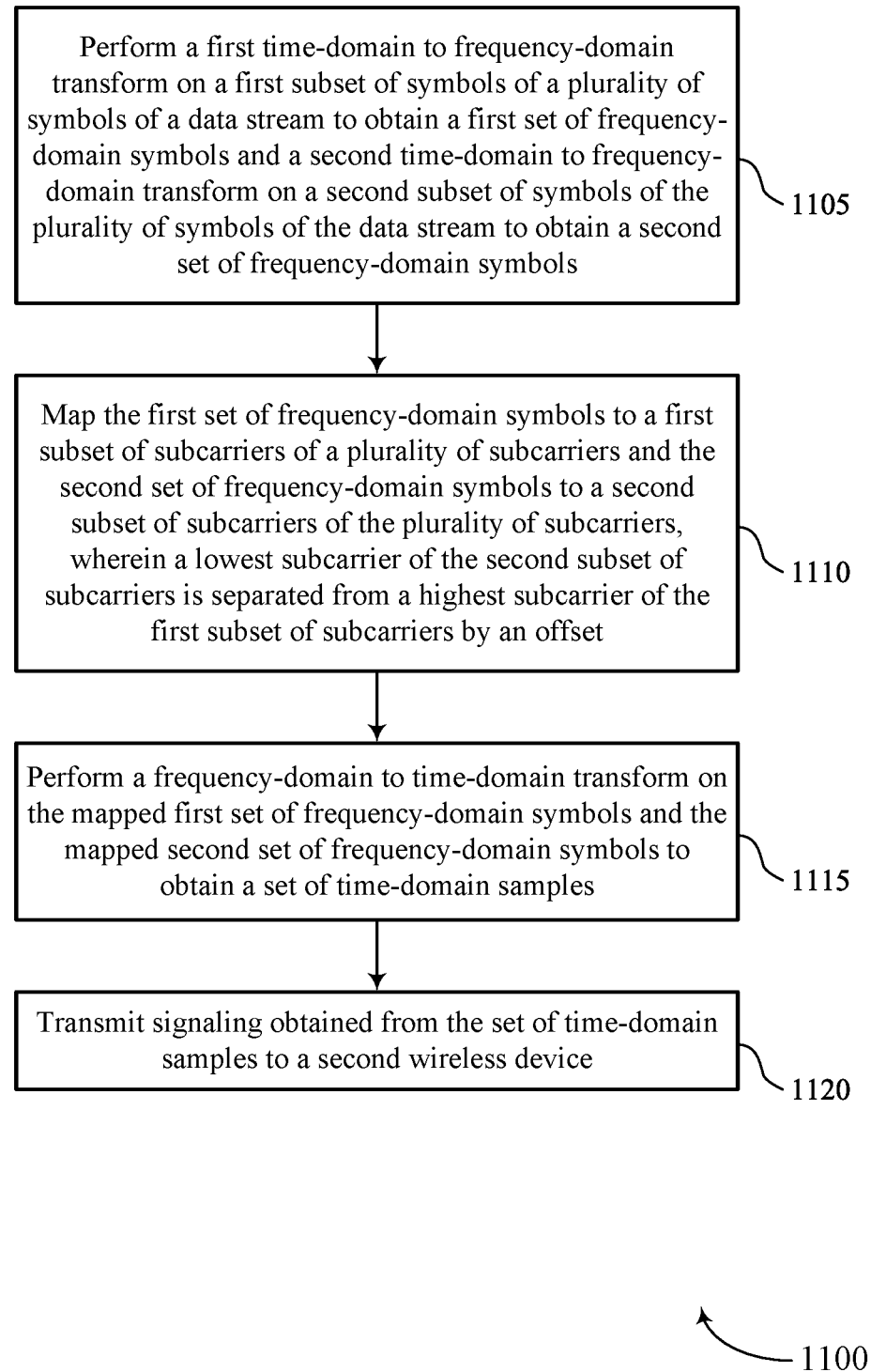
FIGS. 11 and 12 show flowcharts illustrating methods that support resource offset mapping for multiplexing in accordance with one or more aspects of the present disclosure.

FIG. 11 shows a flowchart illustrating a method 1100 that supports resource offset mapping for multiplexing in accordance with one or more aspects of the present disclosure. The operations of the method 1100 may be implemented by a UE or a network entity or its components as described herein. For example, the operations of the method 1100 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include performing a first time-domain to frequency-domain transform on a first subset of symbols of a set of multiple symbols of a data stream to obtain a first set of frequency-domain symbols and a second time-domain to frequency-domain transform on a second subset of symbols of the set of multiple symbols of the data stream to obtain a second set of frequency-domain symbols. The operations of 1105 may be performed in accordance with examples as disclosed herein. In some examples, aspects of the operations of 1105 may be performed by a time-to-frequency transformer 825 as described with reference to FIG. 8.

At 1110, the method may include mapping the first set of frequency-domain symbols to a first subset of subcarriers of a set of multiple subcarriers and the second set of frequency-domain symbols to a second subset of subcarriers of the set of multiple subcarriers, where a lowest subcarrier of the second subset of subcarriers is separated from a highest subcarrier of the first subset of subcarriers by an offset. The operations of 1110 may be performed in accordance with examples as disclosed herein. In some examples, aspects of the operations of 1110 may be performed by a resource mapping manager 830 as described with reference to FIG. 8.

At 1115, the method may include performing a frequency-domain to time-domain transform on the mapped first set of frequency-domain symbols and the mapped second set of frequency-domain symbols to obtain a set of time-domain samples. The operations of 1115 may be performed in accordance with examples as disclosed herein. In some examples, aspects of the operations of 1115 may be performed by a frequency-to-time transformer 835 as described with reference to FIG. 8.

At 1120, the method may include transmitting signaling obtained from the set of time-domain samples to a second wireless device. The operations of 1120 may be performed in accordance with examples as disclosed herein. In some examples, aspects of the operations of 1120 may be performed by a signaling manager 840 as described with reference to FIG. 8.

Figure 12:
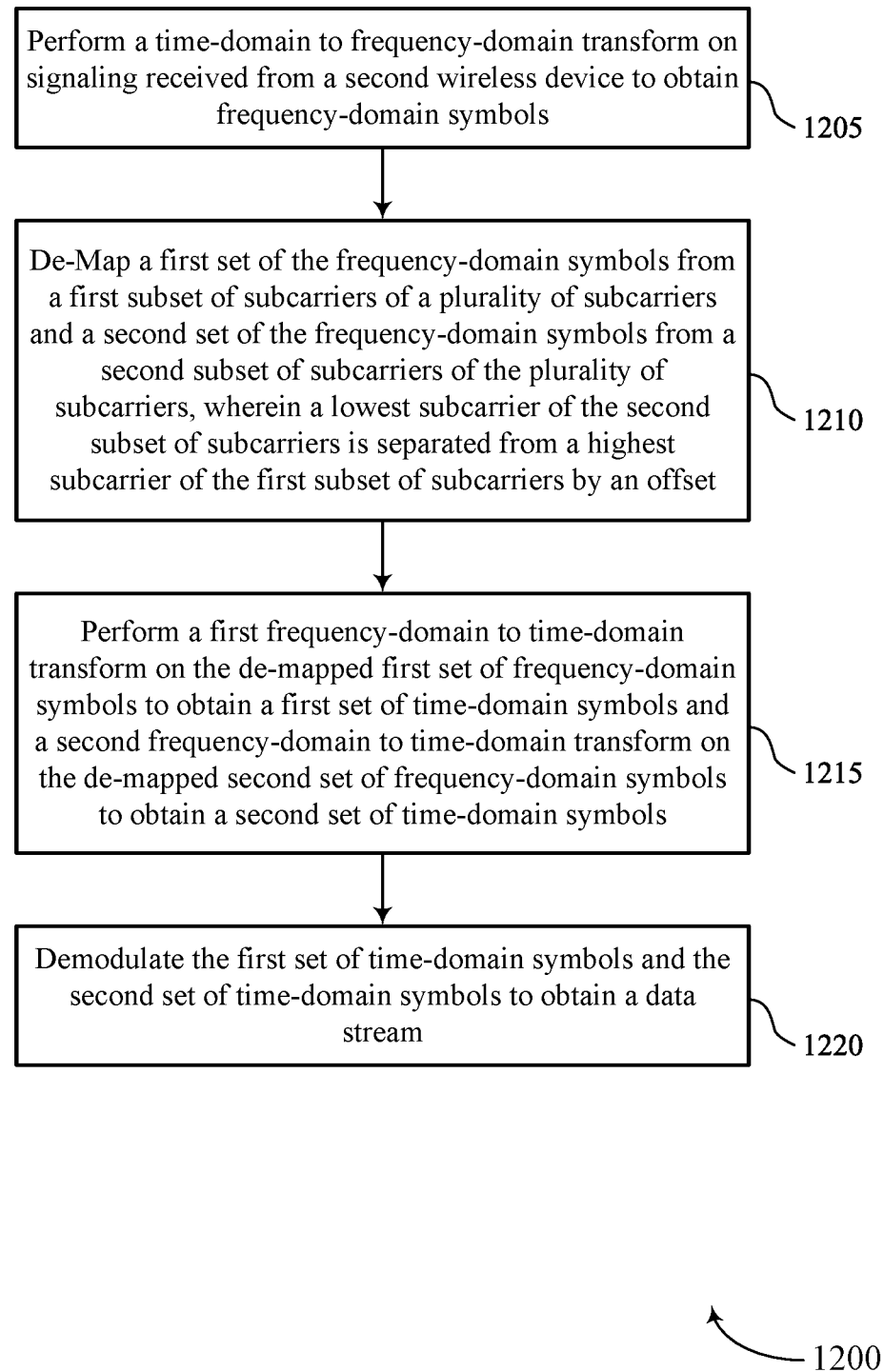

FIG. 12 shows a flowchart illustrating a method 1200 that supports resource offset mapping for multiplexing in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 10. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include performing a time-domain to frequency-domain transform on signaling received from a second wireless device to obtain frequency-domain symbols. The operations of 1205 may be performed in accordance with examples as disclosed herein. In some examples, aspects of the operations of 1205 may be performed by a time-to-frequency transformer 825 as described with reference to FIG. 8.

At 1210, the method may include de-mapping a first set of the frequency-domain symbols from a first subset of subcarriers of a set of multiple subcarriers and a second set of the frequency-domain symbols from a second subset of subcarriers of the set of multiple subcarriers, where a lowest subcarrier of the second subset of subcarriers is separated from a highest subcarrier of the first subset of subcarriers by an offset. The operations of 1210 may be performed in accordance with examples as disclosed herein. In some examples, aspects of the operations of 1210 may be performed by a resource mapping manager 830 as described with reference to FIG. 8.

At 1215, the method may include performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols. The operations of 1215 may be performed in accordance with examples as disclosed herein. In some examples, aspects of the operations of 1215 may be performed by a frequency-to-time transformer 835 as described with reference to FIG. 8.

At 1220, the method may include demodulating the first set of time-domain symbols and the second set of time-domain symbols to obtain a data stream. The operations of 1220 may be performed in accordance with examples as disclosed herein. In some examples, aspects of the operations of 1220 may be performed by a signaling manager 840 as described with reference to FIG. 8.

The following provides an overview of aspects of the present disclosure:

Aspect 1: A method for wireless communication at a first wireless device, comprising: performing a first time-domain to frequency-domain transform on a first subset of symbols of a plurality of symbols of a data stream to obtain a first set of frequency-domain symbols and a second time-domain to frequency-domain transform on a second subset of symbols of the plurality of symbols of the data stream to obtain a second set of frequency-domain symbols; mapping the first set of frequency-domain symbols to a first subset of subcarriers of a plurality of subcarriers and the second set of frequency-domain symbols to a second subset of subcarriers of the plurality of subcarriers, wherein a lowest subcarrier of the second subset of subcarriers is separated from a highest subcarrier of the first subset of subcarriers by an offset; performing a frequency-domain to time-domain transform on the mapped first set of frequency-domain symbols and the mapped second set of frequency-domain symbols to obtain a set of time-domain samples; and transmitting signaling obtained from the set of time-domain samples to a second wireless device.

Aspect 2: The method of aspect 1, further comprising: transmitting a capability indication indicating that the first wireless device is capable of mapping frequency-domain symbols to different subsets of subcarriers separated by one or more offsets, wherein mapping the first set of frequency-domain symbols to the first subset of subcarriers and the second set of frequency-domain symbols to the second subset of subcarriers is based at least in part on transmitting the capability indication.

Aspect 3: The method of any of aspects 1 through 2, further comprising: receiving a capability indication indicating that the second wireless device is capable of de-mapping frequency-domain symbols from different subsets of subcarriers separated by one or more offsets, wherein mapping the first set of frequency-domain symbols to the first subset of subcarriers and the second set of frequency-domain symbols to the second subset of subcarriers is based at least in part on receiving the capability indication.

Aspect 4: The method of any of aspects 1 through 3, further comprising: transmitting a capability indication indicating a quantity of different subsets of subcarriers to which the first wireless device is capable of mapping frequency-domain symbols, wherein mapping the first set of frequency-domain symbols to the first subset of subcarriers and the second set of frequency-domain symbols to the second subset of subcarriers is based at least in part on the capability indication indicating that the first wireless device is capable of mapping frequency-domain symbols to at least two different subsets of subcarriers.

Aspect 5: The method of any of aspects 1 through 4, further comprising: receiving a capability indication indicating a quantity of different subsets of subcarriers from which the second wireless device is capable of de-mapping frequency-domain symbols, wherein mapping the first set of frequency-domain symbols to the first subset of subcarriers and the second set of frequency-domain symbols to the second subset of subcarriers is based at least in part on the capability indication indicating that the second wireless device is capable of de-mapping frequency-domain symbols from at least two different subsets of subcarriers.

Aspect 6: The method of any of aspects 1 through 5, further comprising: communicating an indication of one or more locations at which the first wireless device is to divide a set of subcarriers into different subsets of subcarriers for mapping frequency-domain symbols, wherein the plurality of subcarriers is divided at one of the one or more locations into the first subset of subcarriers to which the first set of frequency-domain symbols are mapped and the second subset of subcarriers to which the second set of frequency-domain symbols are mapped.

Aspect 7: The method of any of aspects 1 through 6, further comprising: communicating an indication of the offset between the lowest subcarrier of the second subset of subcarriers and the highest subcarrier of the first subset of subcarriers, wherein mapping the first set of frequency-domain symbols to the first subset of subcarriers and the second set of frequency-domain symbols to the second subset of subcarriers is based at least in part on communicating the indication of the offset.

Aspect 8: The method of any of aspects 1 through 7, further comprising: communicating an indication of mapping the first set of frequency-domain symbols to the first subset of subcarriers and the second set of frequency-domain symbols to the second subset of subcarriers, wherein mapping the first set of frequency-domain symbols to the first subset of subcarriers and the second set of frequency-domain symbols to the second subset of subcarriers is based at least in part on communicating the indication.

Aspect 9: The method of aspect 8, further comprising: communicating a request to map the first set of frequency-domain symbols to the first subset of subcarriers and the second set of frequency-domain symbols to the second subset of subcarriers, wherein communicating the indication is based at least in part on communicating the request.

Aspect 10: The method of aspect 9, further comprising: determining, based at least in part on reference signals received from the second wireless device, an impact of leakage on a signal-to-noise ratio for subcarriers between the first subset of subcarriers and the second subset of subcarriers, wherein communicating the request is based at least in part on the impact of the leakage satisfying a threshold.

Aspect 11: The method of any of aspects 1 through 10, further comprising: communicating an indication to map other frequency-domain symbols to a contiguous set of subcarriers for a subsequent data stream; and mapping the other frequency-domain symbols to the contiguous set of subcarriers for the subsequent data stream based at least in part on communicating the indication.

Aspect 12: The method of aspect 11, further comprising: communicating a request to map the other frequency-domain symbols to the contiguous set of subcarriers for the subsequent data stream, wherein communicating the indication is based at least in part on communicating the request.

Aspect 13: The method of aspect 12, further comprising: determining, based at least in part on reference signals received from the second wireless device, an impact of leakage on a signal-to-noise ratio on a subset of the contiguous set of subcarriers, wherein communicating the request is based at least in part on the impact of the leakage failing to satisfy a threshold.

Aspect 14: A method for wireless communication at a first wireless device, comprising: performing a time-domain to frequency-domain transform on signaling received from a second wireless device to obtain frequency-domain symbols; de-mapping a first set of the frequency-domain symbols from a first subset of subcarriers of a plurality of subcarriers and a second set of the frequency-domain symbols from a second subset of subcarriers of the plurality of subcarriers, wherein a lowest subcarrier of the second subset of subcarriers is separated from a highest subcarrier of the first subset of subcarriers by an offset; performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols; and demodulating the first set of time-domain symbols and the second set of time-domain symbols to obtain a data stream.

Aspect 15: The method of aspect 14, further comprising: transmitting a capability indication indicating that the first wireless device is capable of de-mapping frequency-domain symbols from different subsets of subcarriers separated by one or more offsets, wherein de-mapping the first set of frequency-domain symbols from the first subset of subcarriers and the second set of frequency-domain symbols from the second subset of subcarriers is based at least in part on transmitting the capability indication.

Aspect 16: The method of any of aspects 14 through 15, further comprising: receiving a capability indication indicating that the second wireless device is capable of mapping frequency-domain symbols to different subsets of subcarriers separated by one or more offsets, wherein de-mapping the first set of frequency-domain symbols from the first subset of subcarriers and the second set of frequency-domain symbols from the second subset of subcarriers is based at least in part on receiving the capability indication.

Aspect 17: The method of any of aspects 14 through 16, further comprising: transmitting a capability indication indicating a quantity of different subsets of subcarriers from which the first wireless device is capable of de-mapping frequency-domain symbols, wherein de-mapping the first set of frequency-domain symbols from the first subset of subcarriers and the second set of frequency-domain symbols from the second subset of subcarriers is based at least in part on the capability indication indicating that the first wireless device is capable of de-mapping frequency-domain symbols from at least two different subsets of subcarriers.

Aspect 18: The method of any of aspects 14 through 17, further comprising: receiving a capability indication indicating a quantity of different subsets of subcarriers to which the second wireless device is capable of mapping frequency-domain symbols, wherein de-mapping the first set of frequency-domain symbols from the first subset of subcarriers and the second set of frequency-domain symbols from the second subset of subcarriers is based at least in part on the capability indication indicating that the second wireless device is capable of mapping frequency-domain symbols to at least two different subsets of subcarriers.

Aspect 19: The method of any of aspects 14 through 18, further comprising: communicating an indication of one or more locations at which the first wireless device is to divide a set of subcarriers into different subsets of subcarriers for de-mapping frequency-domain symbols, wherein the plurality of subcarriers is divided at one of the one or more locations into the first subset of subcarriers from which the first set of frequency-domain symbols are de-mapped and the second subset of subcarriers from which the second set of frequency-domain symbols are de-mapped.

Aspect 20: The method of any of aspects 14 through 19, further comprising: communicating an indication of the offset between the lowest subcarrier of the second subset of subcarriers and the highest subcarrier of the first subset of subcarriers, wherein de mapping the first set of frequency-domain symbols from the first subset of subcarriers and the second set of frequency-domain symbols from the second subset of subcarriers is based at least in part on communicating the indication of the offset.

Aspect 21: The method of any of aspects 14 through 20, further comprising: communicating an indication to de-map the first set of frequency-domain symbols from the first subset of subcarriers and the second set of frequency-domain symbols from the second subset of subcarriers, wherein de-mapping the first set of frequency-domain symbols from the first subset of subcarriers and the second set of frequency-domain symbols from the second subset of subcarriers is based at least in part on communicating the indication.

Aspect 22: The method of aspect 21, further comprising: communicating a request for the second wireless device to map the first set of frequency-domain symbols to the first subset of subcarriers and the second set of frequency-domain symbols to the second subset of subcarriers, wherein communicating the indication is based at least in part on communicating the request.

Aspect 23: The method of aspect 22, further comprising: determining, based at least in part on reference signals received from the second wireless device, an impact of leakage on a signal-to-noise ratio on subcarriers between the first subset of subcarriers and the second subset of subcarriers, wherein communicating the request is based at least in part on the impact of the leakage satisfying a threshold.

Aspect 24: The method of any of aspects 14 through 23, further comprising: communicating an indication to de-map other frequency-domain symbols from a contiguous set of subcarriers for a subsequent data stream; and de-mapping the other frequency-domain symbols from the contiguous set of subcarriers for the subsequent data stream based at least in part on communicating the indication.

Aspect 25: The method of aspect 24, further comprising: communicating a request for the second wireless device to map the other frequency-domain symbols to the contiguous set of subcarriers for the subsequent data stream, wherein receiving the indication is based at least in part on communicating the request.

Aspect 26: The method of aspect 25, further comprising: determining, based at least in part on reference signals received from the second wireless device, an impact of leakage on a signal-to-noise ratio on a subset of the contiguous set of subcarriers, wherein communicating the request is based at least in part on the impact of the leakage failing to satisfy a threshold.

Aspect 27: An apparatus for wireless communication at a first wireless device, comprising a processor; memory coupled with the processor; and instructions stored in the memory and executable by the processor to cause the apparatus to perform a method of any of aspects 1 through 13.

Aspect 28: An apparatus for wireless communication at a first wireless device, comprising at least one means for performing a method of any of aspects 1 through 13.

Aspect 29: A non-transitory computer-readable medium storing code for wireless communication at a first wireless device, the code comprising instructions executable by a processor to perform a method of any of aspects 1 through 13.

Aspect 30: An apparatus for wireless communication at a first wireless device, comprising a processor; memory coupled with the processor; and instructions stored in the memory and executable by the processor to cause the apparatus to perform a method of any of aspects 14 through 26.

Aspect 31: An apparatus for wireless communication at a first wireless device, comprising at least one means for performing a method of any of aspects 14 through 26.

Aspect 32: A non-transitory computer-readable medium storing code for wireless communication at a first wireless device, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   a processor;
   memory coupled with the processor; and
   instructions stored in the memory and executable by the processor to cause the apparatus to:
      perform a first time-domain to frequency-domain transform on a first subset of symbols of a plurality of symbols of a data stream to obtain a first set of frequency-domain symbols and a second time-domain to frequency-domain transform on a second subset of symbols of the plurality of symbols of the data stream to obtain a second set of frequency-domain symbols;
      map the first set of frequency-domain symbols to a first subset of subcarriers of a plurality of subcarriers and the second set of frequency-domain symbols to a second subset of subcarriers of the plurality of subcarriers, wherein a lowest subcarrier of the second subset of subcarriers is separated from a highest subcarrier of the first subset of subcarriers by an offset;
      perform a frequency-domain to time-domain transform on the mapped first set of frequency-domain symbols and the mapped second set of frequency-domain symbols to obtain a set of time-domain samples; and
      transmit signaling obtained from the set of time-domain samples to a second wireless device.

2. The apparatus of claim 1, wherein the instructions are further executable by the processor to cause the apparatus to:
   transmit a capability indication indicating that the first wireless device is capable of mapping frequency-domain symbols to different subsets of subcarriers separated by one or more offsets, wherein mapping the first set of frequency-domain symbols to the first subset of subcarriers and the second set of frequency-domain symbols to the second subset of subcarriers is based at least in part on transmitting the capability indication.

3. The apparatus of claim 1, wherein the instructions are further executable by the processor to cause the apparatus to:
   receive a capability indication indicating that the second wireless device is capable of de-mapping frequency-domain symbols from different subsets of subcarriers separated by one or more offsets, wherein mapping the first set of frequency-domain symbols to the first subset of subcarriers and the second set of frequency-domain symbols to the second subset of subcarriers is based at least in part on receiving the capability indication.

4. The apparatus of claim 1, wherein the instructions are further executable by the processor to cause the apparatus to:
   transmit a capability indication indicating a quantity of different subsets of subcarriers to which the first wireless device is capable of mapping frequency-domain symbols, wherein mapping the first set of frequency-domain symbols to the first subset of subcarriers and the second set of frequency-domain symbols to the second subset of subcarriers is based at least in part on the capability indication indicating that the first wireless device is capable of mapping frequency-domain symbols to at least two different subsets of subcarriers.

5. The apparatus of claim 1, wherein the instructions are further executable by the processor to cause the apparatus to:
   receive a capability indication indicating a quantity of different subsets of subcarriers from which the second wireless device is capable of de-mapping frequency-domain symbols, wherein mapping the first set of frequency-domain symbols to the first subset of subcarriers and the second set of frequency-domain symbols to the second subset of subcarriers is based at least in part on the capability indication indicating that the second wireless device is capable of de-mapping frequency-domain symbols from at least two different subsets of subcarriers.

6. The apparatus of claim 1, wherein the instructions are further executable by the processor to cause the apparatus to:
   communicate an indication of one or more locations at which the first wireless device is to divide a set of subcarriers into different subsets of subcarriers for mapping frequency-domain symbols, wherein the plurality of subcarriers is divided at one of the one or more locations into the first subset of subcarriers to which the first set of frequency-domain symbols are mapped and the second subset of subcarriers to which the second set of frequency-domain symbols are mapped.

7. The apparatus of claim 1, wherein the instructions are further executable by the processor to cause the apparatus to:
   communicate an indication of the offset between the lowest subcarrier of the second subset of subcarriers and the highest subcarrier of the first subset of subcarriers, wherein mapping the first set of frequency-domain symbols to the first subset of subcarriers and the second set of frequency-domain symbols to the second subset of subcarriers is based at least in part on communicating the indication of the offset.

8. The apparatus of claim 1, wherein the instructions are further executable by the processor to cause the apparatus to:
   communicate an indication of mapping the first set of frequency-domain symbols to the first subset of subcarriers and the second set of frequency-domain symbols to the second subset of subcarriers, wherein mapping the first set of frequency-domain symbols to the first subset of subcarriers and the second set of frequency-domain symbols to the second subset of subcarriers is based at least in part on communicating the indication.

9. The apparatus of claim 8, wherein the instructions are further executable by the processor to cause the apparatus to:

communicate a request to map the first set of frequency-domain symbols to the first subset of subcarriers and the second set of frequency-domain symbols to the second subset of subcarriers, wherein communicating the indication is based at least in part on communicating the request.

10. The apparatus of claim 9, wherein the instructions are further executable by the processor to cause the apparatus to:
determine, based at least in part on reference signals received from the second wireless device, an impact of leakage on a signal-to-noise ratio for subcarriers between the first subset of subcarriers and the second subset of subcarriers, wherein communicating the request is based at least in part on the impact of the leakage satisfying a threshold.

11. The apparatus of claim 1, wherein the instructions are further executable by the processor to cause the apparatus to:
communicate an indication to map other frequency-domain symbols to a contiguous set of subcarriers for a subsequent data stream; and
map the other frequency-domain symbols to the contiguous set of subcarriers for the subsequent data stream based at least in part on communicating the indication.

12. The apparatus of claim 11, wherein the instructions are further executable by the processor to cause the apparatus to:
communicate a request to map the other frequency-domain symbols to the contiguous set of subcarriers for the subsequent data stream, wherein communicating the indication is based at least in part on communicating the request.

13. The apparatus of claim 12, wherein the instructions are further executable by the processor to cause the apparatus to:
determine, based at least in part on reference signals received from the second wireless device, an impact of leakage on a signal-to-noise ratio on a subset of the contiguous set of subcarriers, wherein communicating the request is based at least in part on the impact of the leakage failing to satisfy a threshold.

14. An apparatus for wireless communication at a first wireless device, comprising:
a processor;
memory coupled with the processor; and
instructions stored in the memory and executable by the processor to cause the apparatus to:
perform a time-domain to frequency-domain transform on signaling received from a second wireless device to obtain frequency-domain symbols;
de-map a first set of the frequency-domain symbols from a first subset of subcarriers of a plurality of subcarriers and a second set of the frequency-domain symbols from a second subset of subcarriers of the plurality of subcarriers, wherein a lowest subcarrier of the second subset of subcarriers is separated from a highest subcarrier of the first subset of subcarriers by an offset;
perform a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols; and
demodulate the first set of time-domain symbols and the second set of time-domain symbols to obtain a data stream.

15. The apparatus of claim 14, wherein the instructions are further executable by the processor to cause the apparatus to:
transmit a capability indication indicating that the first wireless device is capable of de-mapping frequency-domain symbols from different subsets of subcarriers separated by one or more offsets, wherein de-mapping the first set of frequency-domain symbols from the first subset of subcarriers and the second set of frequency-domain symbols from the second subset of subcarriers is based at least in part on transmitting the capability indication.

16. The apparatus of claim 14, wherein the instructions are further executable by the processor to cause the apparatus to:
receive a capability indication indicating that the second wireless device is capable of mapping frequency-domain symbols to different subsets of subcarriers separated by one or more offsets, wherein de-mapping the first set of frequency-domain symbols from the first subset of subcarriers and the second set of frequency-domain symbols from the second subset of subcarriers is based at least in part on receiving the capability indication.

17. The apparatus of claim 14, wherein the instructions are further executable by the processor to cause the apparatus to:
transmit a capability indication indicating a quantity of different subsets of subcarriers from which the first wireless device is capable of de-mapping frequency-domain symbols, wherein de-mapping the first set of frequency-domain symbols from the first subset of subcarriers and the second set of frequency-domain symbols from the second subset of subcarriers is based at least in part on the capability indication indicating that the first wireless device is capable of de-mapping frequency-domain symbols from at least two different subsets of subcarriers.

18. The apparatus of claim 14, wherein the instructions are further executable by the processor to cause the apparatus to:
receive a capability indication indicating a quantity of different subsets of subcarriers to which the second wireless device is capable of mapping frequency-domain symbols, wherein de-mapping the first set of frequency-domain symbols from the first subset of subcarriers and the second set of frequency-domain symbols from the second subset of subcarriers is based at least in part on the capability indication indicating that the second wireless device is capable of mapping frequency-domain symbols to at least two different subsets of subcarriers.

19. The apparatus of claim 14, wherein the instructions are further executable by the processor to cause the apparatus to:
communicate an indication of one or more locations at which the first wireless device is to divide a set of subcarriers into different subsets of subcarriers for de-mapping frequency-domain symbols, wherein the plurality of subcarriers is divided at one of the one or more locations into the first subset of subcarriers from which the first set of frequency-domain symbols are de-mapped and the second subset of subcarriers from which the second set of frequency-domain symbols are de-mapped.

20. The apparatus of claim 14, wherein the instructions are further executable by the processor to cause the apparatus to:
communicate an indication of the offset between the lowest subcarrier of the second subset of subcarriers and the highest subcarrier of the first subset of subcarriers, wherein de mapping the first set of frequency-domain symbols from the first subset of subcarriers and the second set of frequency-domain symbols from the second subset of subcarriers is based at least in part on communicating the indication of the offset.

21. The apparatus of claim 14, wherein the instructions are further executable by the processor to cause the apparatus to:
communicate an indication to de-map the first set of frequency-domain symbols from the first subset of subcarriers and the second set of frequency-domain symbols from the second subset of subcarriers, wherein de-mapping the first set of frequency-domain symbols from the first subset of subcarriers and the second set of frequency-domain symbols from the second subset of subcarriers is based at least in part on communicating the indication.

22. The apparatus of claim 21, wherein the instructions are further executable by the processor to cause the apparatus to:
communicate a request for the second wireless device to map the first set of frequency-domain symbols to the first subset of subcarriers and the second set of frequency-domain symbols to the second subset of subcarriers, wherein communicating the indication is based at least in part on communicating the request.

23. The apparatus of claim 22, wherein the instructions are further executable by the processor to cause the apparatus to:
determine, based at least in part on reference signals received from the second wireless device, an impact of leakage on a signal-to-noise ratio on subcarriers between the first subset of subcarriers and the second subset of subcarriers, wherein communicating the request is based at least in part on the impact of the leakage satisfying a threshold.

24. The apparatus of claim 14, wherein the instructions are further executable by the processor to cause the apparatus to:
communicate an indication to de-map other frequency-domain symbols from a contiguous set of subcarriers for a subsequent data stream; and
de-map the other frequency-domain symbols from the contiguous set of subcarriers for the subsequent data stream based at least in part on communicating the indication.

25. The apparatus of claim 24, wherein the instructions are further executable by the processor to cause the apparatus to:
communicate a request for the second wireless device to map the other frequency-domain symbols to the contiguous set of subcarriers for the subsequent data stream, wherein receiving the indication is based at least in part on communicating the request.

26. The apparatus of claim 25, wherein the instructions are further executable by the processor to cause the apparatus to:
determine, based at least in part on reference signals received from the second wireless device, an impact of leakage on a signal-to-noise ratio on a subset of the contiguous set of subcarriers, wherein communicating the request is based at least in part on the impact of the leakage failing to satisfy a threshold.

27. A method for wireless communication at a first wireless device, comprising:
performing a first time-domain to frequency-domain transform on a first subset of symbols of a plurality of symbols of a data stream to obtain a first set of frequency-domain symbols and a second time-domain to frequency-domain transform on a second subset of symbols of the plurality of symbols of the data stream to obtain a second set of frequency-domain symbols;
mapping the first set of frequency-domain symbols to a first subset of subcarriers of a plurality of subcarriers and the second set of frequency-domain symbols to a second subset of subcarriers of the plurality of subcarriers, wherein a lowest subcarrier of the second subset of subcarriers is separated from a highest subcarrier of the first subset of subcarriers by an offset;
performing a frequency-domain to time-domain transform on the mapped first set of frequency-domain symbols and the mapped second set of frequency-domain symbols to obtain a set of time-domain samples; and
transmitting signaling obtained from the set of time-domain samples to a second wireless device.

28. The method of claim 27, further comprising:
communicating an indication of the offset between the lowest subcarrier of the second subset of subcarriers and the highest subcarrier of the first subset of subcarriers, wherein mapping the first set of frequency-domain symbols to the first subset of subcarriers and the second set of frequency-domain symbols to the second subset of subcarriers is based at least in part on communicating the indication of the offset.

29. A method for wireless communication at a first wireless device, comprising:
performing a time-domain to frequency-domain transform on signaling received from a second wireless device to obtain frequency-domain symbols;
de-mapping a first set of the frequency-domain symbols from a first subset of subcarriers of a plurality of subcarriers and a second set of the frequency-domain symbols from a second subset of subcarriers of the plurality of subcarriers, wherein a lowest subcarrier of the second subset of subcarriers is separated from a highest subcarrier of the first subset of subcarriers by an offset;
performing a first frequency-domain to time-domain transform on the de-mapped first set of frequency-domain symbols to obtain a first set of time-domain symbols and a second frequency-domain to time-domain transform on the de-mapped second set of frequency-domain symbols to obtain a second set of time-domain symbols; and
demodulating the first set of time-domain symbols and the second set of time-domain symbols to obtain a data stream.

30. The method of claim 29, further comprising:
communicating an indication of the offset between the lowest subcarrier of the second subset of subcarriers and the highest subcarrier of the first subset of subcarriers, wherein de mapping the first set of frequency-domain symbols from the first subset of subcarriers and the second set of frequency-domain symbols from the second subset of subcarriers is based at least in part on communicating the indication of the offset.

\* \* \* \* \*